United States Patent
Idei et al.

(10) Patent No.: US 9,870,152 B2
(45) Date of Patent: Jan. 16, 2018

(54) MANAGEMENT SYSTEM AND MANAGEMENT METHOD FOR MANAGING DATA UNITS CONSTITUTING SCHEMAS OF A DATABASE

(75) Inventors: Hideomi Idei, Tokyo (JP); Norifumi Nishikawa, Tokyo (JP); Shinji Fujiwara, Tokyo (JP); Kazuhiko Mogi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 14/404,963

(22) PCT Filed: Jun. 7, 2012

(86) PCT No.: PCT/JP2012/064672
§ 371 (c)(1),
(2), (4) Date: Dec. 2, 2014

(87) PCT Pub. No.: WO2013/183143
PCT Pub. Date: Dec. 12, 2013

(65) Prior Publication Data
US 2015/0177984 A1  Jun. 25, 2015

(51) Int. Cl.
*G06F 12/00* (2006.01)
*G06F 3/06* (2006.01)

(52) U.S. Cl.
CPC .............. *G06F 3/061* (2013.01); *G06F 3/067* (2013.01); *G06F 3/0647* (2013.01); *G06F 3/0665* (2013.01); *G06F 3/0689* (2013.01)

(58) Field of Classification Search
CPC ...... G06F 3/061; G06F 3/0647; G06F 3/0665; G06F 3/067; G06F 3/0689
See application file for complete search history.

(56) References Cited

U.S. PATENT DOCUMENTS

| | | | |
|---|---|---|---|
| 5,502,836 A | * | 3/1996 | Hale ................. G06F 11/1096 369/44.27 |
| 6,880,102 B1 | | 4/2005 | Bridge |
| 2005/0102551 A1 | | 5/2005 | Watanabe |
| 2007/0022100 A1 | | 1/2007 | Kitsuregawa et al. |
| 2007/0150495 A1 | | 6/2007 | Koizumi et al. |

(Continued)

FOREIGN PATENT DOCUMENTS

| | | |
|---|---|---|
| JP | 2007-034414 A | 2/2007 |
| JP | 2007-179146 A | 7/2007 |
| WO | 03/077111 A1 | 9/2003 |

*Primary Examiner* — Larry T Mackall
(74) *Attorney, Agent, or Firm* — Mattingly & Malur, PC

(57) ABSTRACT

A management system manages a plurality of data units constituting schemas of a database in a storage device, which includes a plurality of first storage device sets having a plurality of storage areas. An ordered schema constituted of the plurality of data units having order properties defining respective orders is included in the schemas. When a second storage device set, which is a set of one or more second storage devices and in which each of the storage areas is a free storage area, is added to the first storage device set, the management system migrates two or more data units not consecutive in the order among a plurality of data units stored in the plurality of storage areas in the first storage device set respectively from at least the one first storage device set to the free storage areas of the second storage device set.

20 Claims, 19 Drawing Sheets

(56) References Cited

U.S. PATENT DOCUMENTS

2010/0010999 A1\* 1/2010 Gerovac ................. H04L 67/06
                                                                          707/E17.005
2010/0023685 A1\* 1/2010 Ikejiri ................... G06F 1/3221
                                                                           711/114

\* cited by examiner

Fig. 2A

| Schema ID (200) | Schema name (202) | Schema type (204) | Data type (206) | Data area ID (208) | Number of pages used (210) |
|---|---|---|---|---|---|
| 256 | T0 | Table | Ordered addition | 10 | 81920 |
| 257 | T1 | Table | Non-ordered | 11 | 40960 |
| : | : | : | : | : | : |

Schema information 122

Fig. 2B

| DB data area ID (220) | Device file path (222) | Number of area allocated segments (224) | Number of area used segments (226) |
|---|---|---|---|
| 10 | /dev/sdd | 25 | 20 |
| 11 | /dev/sde | 20 | 10 |
| : | : | : | : |

DB mapping information 124

Fig. 2C

| Schema ID (240) | DB data area ID (242) | Data addition destination logical page ID (244) | Number of added data pages (246) | Added data order property information (248) | Added data range information (250) |
|---|---|---|---|---|---|
| 256 | 10 | 81920 - 86015 | 4096 | 17 | 800000 - 849999 |
| 256 | 10 | 86016 - 90111 | 4096 | 18 | 850000 - 899999 |
| : | : | : | : | : | : |

DB data addition information 126

Fig. 3A

| Device file path (300) | ST-ID (302) | LUN (304) |
|---|---|---|
| /dev/sdd | 1024 | 100 |
| /dev/sde | 1024 | 110 |
| : | : | : |

OS mapping information 132

Fig. 3B

| ST-ID (310) | LUN (312) | Logical page ID (314) | Disk No. (316) | Physical page ID (318) | Segment No. (320) |
|---|---|---|---|---|---|
| 1024 | 100 | 0 – 4095 | 0 | 0 – 4095 | 0 |
| | | 4096 – 8191 | 1 | 0 – 4095 | 0 |
| | | 8192 – 12287 | 2 | 0 – 4095 | 0 |
| | | 12288 – 16383 | 3 | 0 – 4095 | 0 |
| | | 16384 – 20479 | 4 | 0 – 4095 | 0 |
| | | 20478 – 24575 | 0 | 4096 – 8191 | 1 |
| : | : | : | : | : | : |

Storage mapping information 174

Fig. 4A

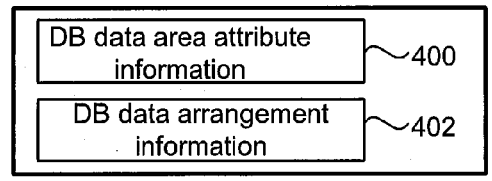

DB data area management information 142

Fig. 4B

| 410 | 412 | 414 | 416 | 418 | 420 | 422 | 424 |
|---|---|---|---|---|---|---|---|
| DB data area ID | Schema ID | Data type | ST-ID | LUN | Number of area allocated segments | Number of area used segments | Data migration disk No. |
| 10 | 256 | Ordered addition | 1024 | 100 | 25 | 20 | 0 |
| 11 | 257 | Non-ordered | 1024 | 110 | 20 | 10 | 10 |
| : | : | : | : | : | : | : | : |

DB data area attribute information 400

Fig. 4C

| 430 | 432 | 434 | 436 | 438 | 440 | 442 |
|---|---|---|---|---|---|---|
| ST-ID | LUN | Logical page ID | Disk No. | Segment No. | Order property information | Data range information |
| 1024 | 100 | 0 -- 4095 | 0 | 0 | 1 | 0 – 49999 |
| | | 4096 – 8191 | 1 | 0 | 2 | 50000 – 99999 |
| | | 8192 – 12287 | 2 | 0 | 3 | 100000 – 149999 |
| | | 12288 – 16383 | 3 | 0 | 4 | 150000 – 199999 |
| | | 16384 – 20479 | 4 | 0 | 5 | 200000 – 249999 |
| | | 20478 – 24575 | 0 | 1 | 6 | 250000 – 299999 |
| : | : | : | : | : | : | : |

DB data arrangement information 402

| ST-ID | LUN | umber of requested additional segments |
|---|---|---|
| 1024 | 100 | 5 |

Data area addition indication 500

| ST-ID | LUN | Migration source disk No. | Migration source segment No. | Migration destination disk No. | Migration destination segment No. |
|---|---|---|---|---|---|
| 1024 | 100 | 0 | 0 | 4 | 0 |

Data migration indication 510

Data migration disk No. ~ 424

MANAGEMENT SYSTEM AND MANAGEMENT METHOD FOR MANAGING DATA UNITS CONSTITUTING SCHEMAS OF A DATABASE

TECHNICAL FIELD

The present invention relates to a technology to manage a physical arrangement of data units of a database (hereinafter, DB).

BACKGROUND ART

Currently, many applications based on DB exist and DBMS that performs a set of processing and management related to DB is extremely important. One feature of DB is that an enormous amount of data is handled. Thus, in many computer systems in which DBMS operates, a system configuration in which a storage apparatus having large-capacity disks is coupled to a computer in which DBMS operates and DB data is stored in the storage apparatus is common.

When this system configuration is adopted, data is stored on disks of the storage apparatus and access to disks is certain to occur when processing on DB (DB processing) is performed. Particularly in super large-scale DB of petabyte class, an enormously long time is needed for processing to search for specific data from data of the DB. As a technology to accelerate search processing to search for specific data from a large amount of data, the technology disclosed in PTL 1 is known.

The technology disclosed in PTL 1 is a technology to multiplex reading of data by dynamically creating a task each time data is read and performing tasks in parallel in a non-ordered sequence. According to DBMS using the technology, when compared with conventional DBMS that performs tasks in the order of creation, search performance can dramatically be improved.

CITATION LIST

Patent Literature

[PTL 1] Japanese Patent Application Publication No. 2007-34414
[PTL 2] U.S. Pat. No. 6,880,102 (Specification)

SUMMARY OF INVENTION

Technical Problem

The above super large-scale DB frequently handles data having order properties (for example, chronological data and so on, hereinafter, called ordered data) added daily such as POS data and sensor data and in the search for the ordered data, the possibility of being accessed may increase as the data is more immediate. In DBMS that attempts to improve performance by perform highly parallel processing and issuing I/O to storage in high multiplexing, it is necessary to, for example, issue I/O to as many disks as possible to achieve I/O multiplicity to obtain the maximum performance. However, if the arrangement of DB data is unbalanced between disks (for example, data is arranged by concentrating on a specific disk, data of close order relations is arranged together on a specific disk and so on), this could directly lead to an imbalance of I/O, resulting in a problem of being unable to increase I/O multiplicity and to obtain the maximum performance. In terms of individual disks, performance improves as a physical access range becomes narrower and thus, it is better to arrange DB data in a disk by maintaining order properties.

As conventional technology to reduce the I/O imbalance, a migration technology using I/O statistics is known. According to this technology, I/O statistics is collected for each disk and when I/O is concentrated on a specific disk, the I/O load is balanced by migrating data on the disk to other disks. However, this technology poses a problem that migration is performed only after an I/O imbalance arises and the performance deteriorates in the meantime.

PTL 2 relates to an efficient management method of a logical volume and discloses a technology to correct an imbalance of data arrangement by performing migration of data at an address (logical address) level of the logical volume when a data area is added to the logical volume. In the technology disclosed in PTL 2 in which migration is performed based on a logical address of a logical volume, data is not migrated in accordance with content of DB data. Even if the logical address and order properties of DB data are related, when the relationship breaks down, data of close order relations may be concentrated on a specific disk or the access range of individual disks may be widened and, as a result, the maximum performance may not be obtained due to an I/O imbalance.

Solution to Problem

A management system manages a plurality of data units constituting one or more schemas of a database in a storage device. The storage apparatus includes a plurality of first storage device sets having a plurality of storage areas. An ordered schema constituted of the plurality of data units having order properties defining respective orders is included in the one or more schemas. When a second storage device set, which is a set of one or more second storage devices and in which each of the storage areas is a free storage area, is added to the first storage device set, the management system migrates two or more data units not consecutive in the order among the plurality of data units stored in the plurality of storage areas in the first storage device set respectively from at least the one first storage device set to the free storage areas of the second storage device set based on management information including mapping information as information indicating which data unit constituting the ordered schema is stored in which storage area and order information indicating the order of the data units such that a plurality of the free storage areas is distributed over the first storage device sets and the second storage device set. The management system may be configured by a single computer or may be a kind of computer system configured by a plurality of computers.

BRIEF DESCRIPTION OF DRAWINGS

FIG. 2A is a configuration diagram of an example of schema information according to the first embodiment.
FIG. 2B is a configuration diagram of an example of DB mapping information according to the first embodiment.
FIG. 2C is a configuration diagram of an example of DB data addition information according to the first embodiment.
FIG. 3A is a configuration diagram of an example of OS mapping information according to the first embodiment.

FIG. 3B is a configuration diagram of an example of storage mapping information according to the first embodiment.

FIG. 4A is a configuration diagram of an example of DB data area management information according to the first embodiment.

FIG. 4B is a configuration diagram of an example of DB data area attribute information according to the first embodiment.

FIG. 4C is a configuration diagram of an example of DB data arrangement information according to the first embodiment.

DESCRIPTION OF EMBODIMENTS

Some embodiments of the present invention will be described with reference to the drawings. The embodiments described below do not limit the invention according to claims and all elements described in the embodiments and combinations thereof are not necessarily needed for solving means of the invention.

In the description that follows, processing may be described by using a "program" as the subject, but the program performs preset processing by being executed by a processor (for example, a CPU (Central Processing Unit)) included in a computer, a storage apparatus or the like appropriately using storage resources (for example, a memory) and/or a communication interface device (for example, a communication port) or the like and therefore, the subject of the processing may be the processor. Processing described by using a program as the subject may be considered as processing performed by a processor or an apparatus (a computer, a storage apparatus or the like) including the processor. A controller may be a processor itself or include a hardware circuit that performs a portion or all of processing performed by the controller. A program may be installed on each controller from a program source. The program source may be, for example, a program delivery computer or a storage medium.

By using, as a replacement of an input/output apparatus in a computer, a serial interface or an Ethernet interface (Ethernet is a registered trademark) as the input/output apparatus, connecting a display, a keyboard, or a display apparatus including a pointing device to the interface, and transmitting display information to the display apparatus or receiving input information from the display apparatus, a display may be made or input may be received by the display apparatus in place of the input and display by the input/output apparatus.

[Embodiment 1]

First, the Embodiment 1 will be described.

Figure 1:
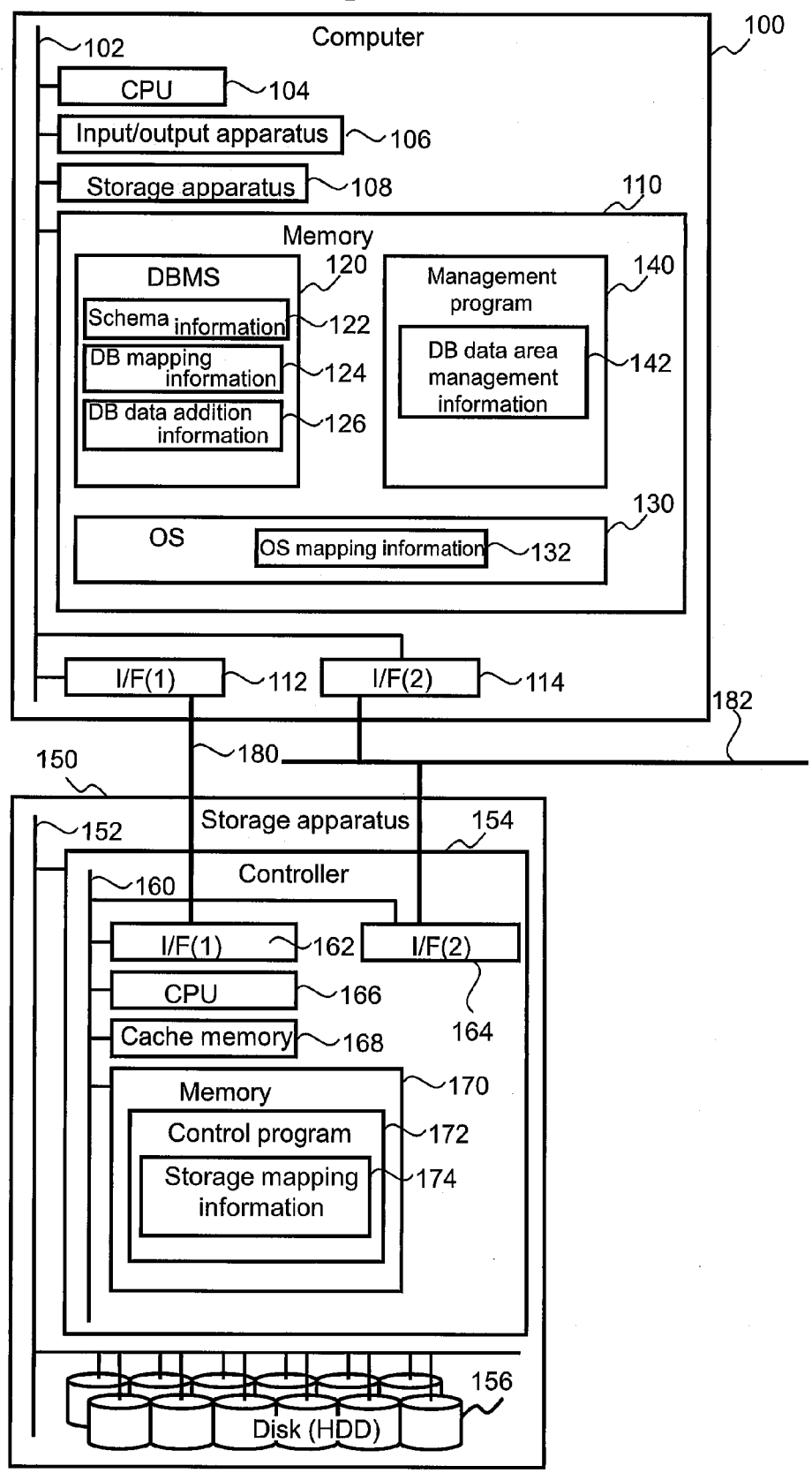
FIG. 1 is a configuration diagram of an example of a computer system according to a first embodiment.

FIG. 1 is a configuration diagram of an example of a computer system according to Embodiment 1.

In the computer system, a computer 100 as an example of a management system and a storage apparatus 150 are coupled via communication networks 180, 182. The computer 100 performs DBMS 120 stored in the storage apparatus 150 to manage data of DB.

The DBMS 120 is preferably DBMS that attempts to improve performance by issuing I/O to the storage apparatus 150 with a high degree of parallelism. For example, the DBMS 120 may accept a DB query and create a query execution plan containing one or more database operations necessary to execute the accepted query and information representing an execution procedure of one or more database operations to execute the accepted query based on the created query execution plan. The DBMS 120 may dynamically generate a task to perform a database operation and execute the dynamically generated task for execution of the query. For example, the DBMS 120 may (a) generate a task to perform a database operation, (b) issue a database read request to read data necessary for the database operation corresponding to the task by executing the generated task, (c) generate a new task, when an (N+1)-th database operation is performed based on an execution result of an N-th database operation corresponding to the task executed in (b), based on the execution result (N is an integer equal to or larger than 1), and (d) perform (b) and (c) of the newly generated task for execution of the query and if two or more executable tasks are present in (b) or (d), at least two tasks of these two or more tasks may be executed in parallel. The DBMS 120 may DBMS according to the technology disclosed in PTL 1.

The communication networks 180, 182 may be networks like local area networks (LAN) or wide area networks (WAN) or networks configured by fiber channels (storage area networks: SAN). In FIG. 1, only one unit of the computer 100 and one unit of the storage apparatus 150 are shown, but a plurality of units of the computer 100 or a plurality of units of the storage apparatus 150 may be installed.

The computer 100 can be realized by, for example, a common computer. For example, the computer 100 includes a CPU (control device) 104, an input/output apparatus 106, a storage apparatus 108, a memory 110, an I/F (1) 112, and an I/F (2) 114. The CPU 104, the input/output apparatus 106, the storage apparatus 108, the memory 110, the I/F (1) 112, and the I/F (2) 114 are coupled via an internal bus 102.

The I/F (1) 112 is an interface with the communication network 180. The I/F (2) 114 is an interface with the communication network 182. The input/output apparatus 106 includes, for example, an input apparatus such as a mouse or a keyboard and an output apparatus such as a liquid crystal display. The DBMS 120, a management program 130, and an operating system (hereinafter, OS) 140 are stored in at least one of the storage apparatus 108 as an example of the storage device for management and the memory 110. The DBMS 120, the management program 130, and the OS 140 are executed by the CPU 104.

The DBMS 120 holds DB mapping information 124 associating schema information 122 about a schema such as a DB table or searching, a DB data area where DB data is logically stored, and a device on the OS 140. When the DBMS 120 adds DB data, the DBMS 120 creates DB data addition information 126 about the added DB data and transmits the DB data addition information 126 to the management program 140. The OS 140 holds OS mapping information 132 associating a device on the OS 140 and a logical storage area on the storage apparatus 150. The management program 140 acquires various kinds of information from the DBMS 120, the OS 130, or a control program 174 of the storage apparatus 150 when necessary and creates and holds DB data area information 142 about attributes of a DB data area or the actual arrangement of DB data. The management program 140 may be included in another computer (for example, the host computer) coupled to the computer 100 via the network 180 or the network 182 and operated on the other computer, or included in the storage apparatus 150 and operated on the storage apparatus 150.

The storage apparatus 150 includes a controller 154 and a plurality of disks (HDD: an example of the storage device) 156 and the controller 154 and the plurality of disks 156 are coupled via an internal bus 152. The controller 154 includes, for example, an I/F (1) 162, an I/F (2) 164, a CPU (control device) 166, a cache memory 168, and a memory 170. The I/F (1) 162, the I/F (2) 164, the CPU 166, the cache memory 168, and the memory 170 are coupled via an internal bus 160.

The I/F (1) 162 is an interface with the communication network 180. The I/F (2) 164 is an interface with the communication network 182. A control program 172 that controls the storage apparatus 150 is stored in the memory 170. The control program 172 is executed by the CPU 166.

The control program 172 holds storage mapping information 174 that associates a logical storage area (LU: Logical Unit) of the storage apparatus 150 and a physical storage area (segment) held by the disk 156. The disk 156 is, for example, a hard disk drive (magnetic storage). In the storage apparatus 150, the plurality of disks 156 may be configured as RAID (Redundant Array of Independent (or Inexpensive) Disks). In addition to the disk 156 or instead of the disk 156, a storage device (for example, a flash memory drive) having other types of storage media may be included.

When a data area addition indication 500 and a data migration indication 510 described later are received by the storage apparatus 150 via the I/F (1) 162 or the I/F (2) 164, if the data area addition indication 500 is accepted, a storage area where data is stored is added according to content of the indication and if the data migration indication 510 is accepted, data (data unit) is migrated according to content of the indication.

Subsequently, details of various kinds of information stored in the computer 100 or the storage apparatus 150 will be described.

FIG. 2A is a configuration diagram of an example of schema information according to Embodiment 1.

The schema information 122 is information about a schema such as a table constituting DB or searching and has entries for each schema.

Each entry includes a field 200 to enter the identifier to identify the schema, a field 202 to enter the name of the schema, a field 204 to enter the type of the schema, a field 206 to enter the type of data handled by the schema, a field 208 to enter the ID (DB data area ID) of the data area where the schema is stored, and a field 210 to enter the number of data pages used. Types of data stored in the field 206 include an ordered addition indicating ordered data to be added sequentially and a non-order indicating that the data is not ordered data. Here, a schema that stores ordered data is an ordered schema. The schema information 122 is created when DB is constructed and updated when DB data is added or deleted.

FIG. 2B is a configuration diagram of an example of DB mapping information according to Embodiment 1.

The DB mapping information 124 is information associating a DB data area where each schema of DB is stored and a device on OS and has entries for each DB data area. Each entry includes a field 220 to enter the identifier (DB data area ID) to identify the DB data area, a field 222 to enter the file path of the device for which the DB data area is created, a field 224 to enter the size (in FIG. 2B, for example, the number of area units called segments allocated) of the physical storage area allocated to the DB data area, and a field 226 to enter the number of segments used in the area allocated to the DE data area. In the present embodiment, for example, 4096 pages of data in DB are stored in one segment. The DB mapping information 124 is created when DB is constructed and updated when a DB data area is added, deleted, or changed.

FIG. 2C is a configuration diagram of an example of DB data addition information according to Embodiment 1.

The DB data addition information 126 is created when DB data is added by the DBMS 120 and transmitted by the management program 140. The DB data addition information 126 is information about added DB information and has entries for each piece of added DB information. Here, each piece of added DB data means each data unit in which DB data of a predetermined amount of data (for example, the amount of data corresponding to one segment) is defined as a unit. Hereinafter, the data unit may also be referred to as DB data. Each entry includes a field 240 to enter the identifier (schema ID) of the schema to which DB data is added, a field 242 to enter the identifier (DB data area ID) of the DB data area to which DB data is added, a field 244 to enter the logical address (In FIG. 2C, for example, the logical page ID) in the DB data area to which DB data is added, a field 246 to enter the size (in FIG. 2C, for example, the number of data pages) of the added DB data, a field 248 to enter information (order property information) capable of identifying the order of the added DB information, and a field 250 to enter information (for example, a range in which ID is from 0 to 49999) of the range of the added DB data. The field 248 and the field 250 are valid only if the data type of the schema of the added DB data is the ordered addition and corresponding information is stored in each field.

FIG. 3A is a configuration diagram of an example of OS mapping information according to Embodiment 1.

The OS mapping information 132 is information associating a device on the OS 130 and a logical storage area (LU) on the storage apparatus 150 and has entries for each device. Each entry includes a field 300 to enter the file path on the OS 130 where the device is created, a field 302 to enter the identifier (storage apparatus ID: ST-ID) to identify the storage apparatus 150 having the storage area (LU) corresponding to the device, and a field 304 to enter the number (LUN) to identify the storage area (LU) corresponding to the device. The OS mapping information 132 is created when a system is constructed and updated when the system configuration is changed.

FIG. 3B is a configuration diagram of an example of storage mapping information according to Embodiment 1.

The storage mapping information 174 is information associating a logical storage area (LU) of the storage apparatus 150 and a segment as a physical area held by the disk 156 and has entries for each segment constituting LU. Each entry includes a field 310 to enter the identifier (ST-ID) to identify the storage apparatus 150, a field 312 to enter the number (LUN) to identify the LU, a field 314 to enter the address (for example, the logical page ID) of the logical storage area in the LU, a field 316 to enter the number (disk No.) to identify the disk storing the segment, a field 318 to enter the address (for example, the physical page ID) in the segment corresponding to the logical area of the field 314, and a field 320 to enter the number (segment No.) to identify the segment. In the present embodiment, the segment No. stored in the field 320 is the number for unique identification in the disk indicated by the disk No. The storage mapping information 174 is created when a system is constructed and updated when the system configuration is changed. The disk in the field 316 may be one hard disk drive (HDD) or RG (Raid Group) in which a plurality of HDD is configured as RAID. Here, one hard disk or RG is a storage device set.

FIG. 4A is a configuration diagram of an example of DB data area management information according to Embodiment 1.

The DB data area management information 142 is created and held by the management program 140. The DB data area management information 142 includes DB data area attribute information 400 and DB data arrangement information 402.

FIG. 4B is a configuration diagram of an example of DB data area attribute information according to Embodiment 1.

The DB data area attribute information 400 is information about the DB data area and has entries for each DB data area. Each entry includes a field 410 to enter the identifier (DB data area ID) to identify the DB data area, a field 412 to enter the identifier (schema ID) to identify the schema stored in the DB data area, a field 414 to enter the type of data handled by the schema stored in the DB data area, a field 416 to enter the identifier to identify the storage apparatus 150 in which the DB data area is created, a field 418 to enter the number (LUN) to identify the storage area (LU) on the storage apparatus 150 in which the DB data area is created, a field 420 to enter the number of segments allocated to the DB data area, a field 422 to enter the number of segments used in the area allocated to the DB data area, and a field 424 to enter the number (disk No.) of the disk intended for the next data migration. The DB data area attribute information 400 is created when the management program 140 is activated based on the schema information 122 and the DB mapping information 124 acquired from the DBMS 120, the OS mapping information 132 acquired from the OS 130, and the storage mapping information 174 acquired from the control program 172 of the storage apparatus 150 and then updated if necessary when DB data is added.

FIG. 4C is a configuration diagram of an example of DB data arrangement information according to Embodiment 1.

The DB data arrangement information 402 is information about the physical arrangement of the data unit as DB data of a predetermined amount of data and has entries for each segment capable of storing one data unit. Each entry includes a field 430 to enter the identifier (ST-ID) to identify the storage apparatus 150, a field 432 to enter the number (LUN) to identify LU, a field 434 to enter the address (for example, the logical page ID) of the logical area in the LU, a field 436 to enter the number (disk No.) to identify the disk storing the segment, a field 438 to enter the number (segment No.) to identify the segment, a field 440 to enter order property information of DB data (data unit) stored in the segment, and a field 442 to enter information about the range of DB data (data unit) stored in the segment. The DB data arrangement information 402 is created when the management program 140 is activated and when the DBMS 120 adds DB data and transmits the DB data addition information 126 to the management program 140, an entry is added based on content of the DB data addition information 126.

Figures 5A, 5B, 5C:
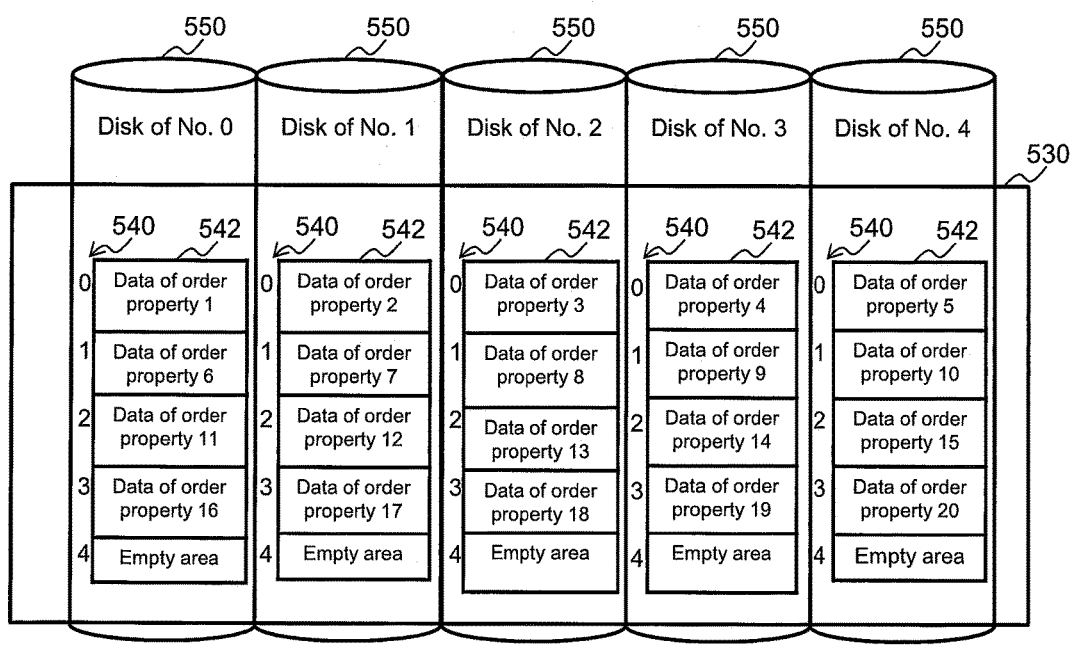
FIG. 5A is a configuration diagram of an example of a data area addition indication according to the first embodiment.
FIG. 5B is a configuration diagram of an example of a data migration indication according to the first embodiment.
FIG. 5C is a diagram showing a physical arrangement example of order additional DB data according to the first embodiment.

FIG. 5A is a configuration diagram of an example of a data area addition indication according to Embodiment 1.

The data area addition indication 500 is issued to the storage apparatus 150 by the management program 140. The data area addition indication 500 includes a field 502 to enter the identifier to identify the storage apparatus 150 to which a data storage area (data area) is added, a field 504 to enter the number (LUN) of the storage area (LU) to which the data area is added, a field 506 to enter the number of segments of the added data area. The storage apparatus 150 having received the data area addition indication 500 adds segments of the number of segments specified in the field 506 to the storage area specified in the field 504 from an internally held unused data area, updates the storage mapping information 174, and returns the result thereof to the management program 140.

FIG. 5B is a configuration diagram of an example of a data migration indication according to Embodiment 1.

The data migration indication 510 is issued to the storage apparatus 150 by the management program 140. The data migration indication 510 includes a field 512 to enter the identifier to identify the storage apparatus to which data is migrated, a field 514 to enter the number (LUN) of the storage area (LU) to which data is migrated, a field 516 to enter the number of the disk of the data migration source, a field 518 to enter the number to identify the segment of the data migration source, a field 520 to enter the number of the disk of the data migration destination, and a field 522 to enter the number to identify the segment of the data migration destination. The storage apparatus 150 having received the data migration indication 510 migrates DB data (data unit) in the segment specified in the field 518 of the disk specified in the field 516 to the segment specified in the field 522 of the disk specified in the field 520, updates the storage mapping information 174, and returns the result thereof to the management program 140.

FIG. 5C is a diagram showing a physical arrangement example of order additional DB data according to Embodiment 1.

LU 530 is configured by five disks 550 whose numbers are 0 to 4. Five segments 542 whose numbers are 0 to 4 of the segment No. 540 are allocated to each of the disks 550. DB data (data unit) of an order property 1 is stored in the segment 542 of the segment No. 0 of the disk No. 0, DB data of an order property 2 is stored in the segment of the segment No. 0 of the disk No. 1, DB data of an order property 3 is stored in the segment 542 of the segment No. 0 of the disk No. 2, DB data of an order property 4 is stored in the segment 542 of the segment No. 0 of the disk No. 3, DB data of an order property 5 is stored in the segment 542 of the segment No. 0 of the disk No. 4, DB data of an order property 6 is stored in the segment 542 of the segment No. 1 of the disk No. 0, and similarly, DB data of an order property 7 and thereafter is stored in each of the segments 542 of each of the disks 550. The storage apparatus 150 distributes DB data such that, as shown in FIG. 5C, consecutive DB data is stored in the different disks 550.

The segment 542 of the segment No. 0 of the disk No. 0, the segment 542 of the segment No. 0 of the disk No. 1, the segment 542 of the segment No. 0 of the disk No. 2, the segment 542 of the segment No. 0 of the disk No. 3, the segment 542 of the segment No. 0 of the disk No. 4, the segment 542 of the segment No. 1 of the disk No. 0, the segment 542 of the segment No. 1 of the disk No. 1, . . . correspond to logical storage areas in the LU 530 in the order starting with the first storage area.

Next, a processing operation in a computer system according to Embodiment 1 will be described.

Figure 6:
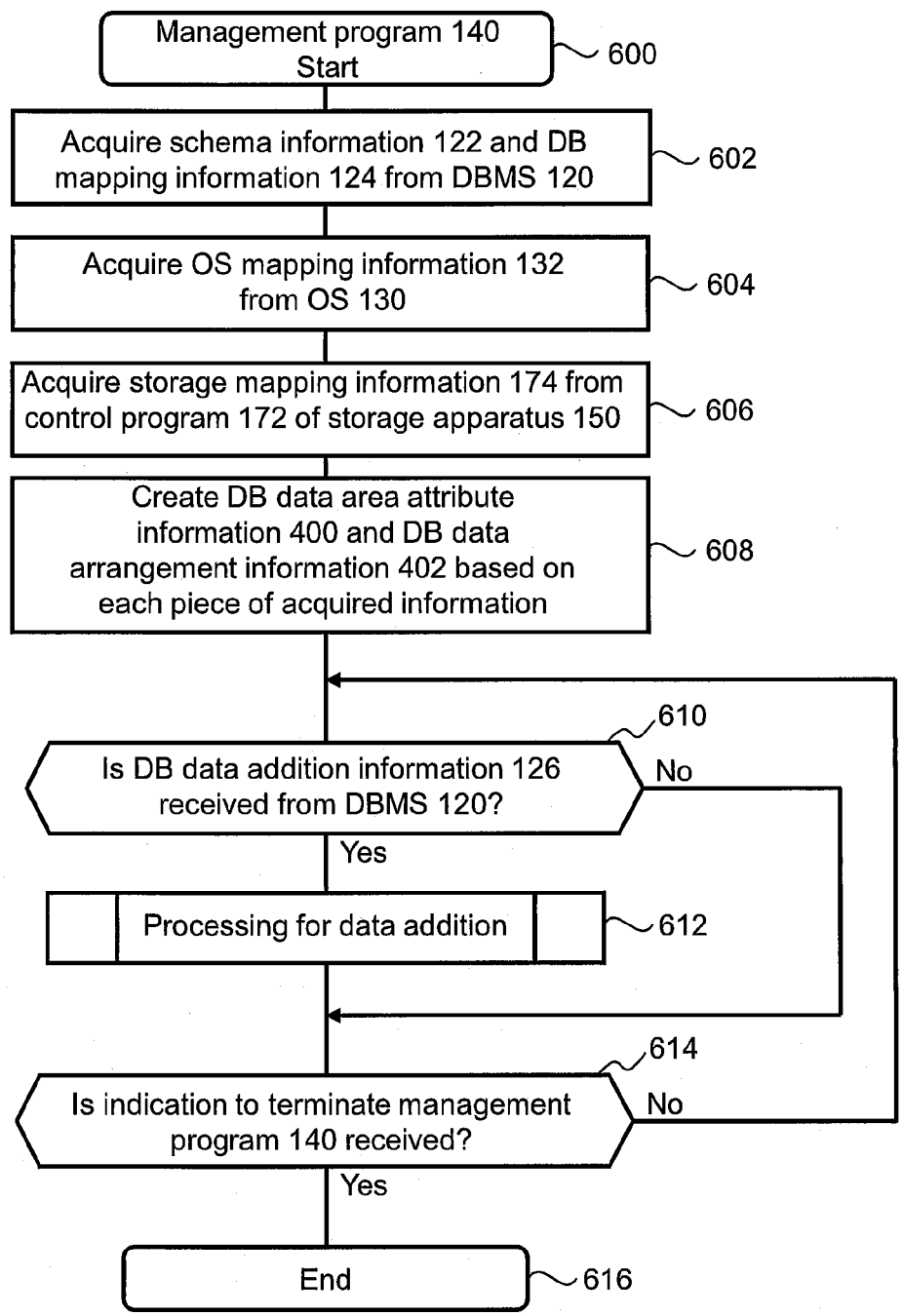
FIG. 6 is a flow chart of management processing according to the first embodiment.

FIG. 6 is a flow chart of management processing according to Embodiment 1.

The management processing is realized by the management program 140 being executed by the CPU 104 of the computer 100.

When the management program 140 is activated on the computer 100 by the system administrator or the like, the management processing is started (step 600).

The management program 140 acquires the schema information 122 and the DB mapping information 124 from the DBMS 120 (step 602), acquires the OS mapping information 132 from the OS 130 (step 604), acquires the storage mapping information 174 from the control program 172 of the storage apparatus 150 (step 606), creates DB data area attribute information 400 and the DB data arrangement information 402 from the above information (step 608), and then waits to receive the DB data addition information 126 from the DBMS 120.

The management program 140 determines whether the DB data addition information 126 is received from the DBMS 120 (step 610) and if, as a result, the DB data addition information 126 has been received (Yes in step 610), performs processing for data addition (see FIG. 7) (step 612). After performing the processing for data addition, the management program 140 gives a write indication of added data into the storage apparatus 150 to the DBMS 120 so that the added data is stored in the storage apparatus 150 according to the indication of the DBMS 120. Incidentally, the storage apparatus 150 stores added data in free areas such that consecutive data is distributed over different disks.

After completing the processing for data addition or if the DB data addition information 126 is not received in step 610 (No in step 610), the management program 140 determines whether an indication to terminate the management program 140 is received from the system administrator (step 614) and if, as a result, the indication of termination has been received (Yes in step 614), terminates the management processing by terminating the management program 140 (step 616). On the other hand, if no indication of termination has been received (No in step 614), the management program 140 repeats the processing starting with step 610.

Figure 7:
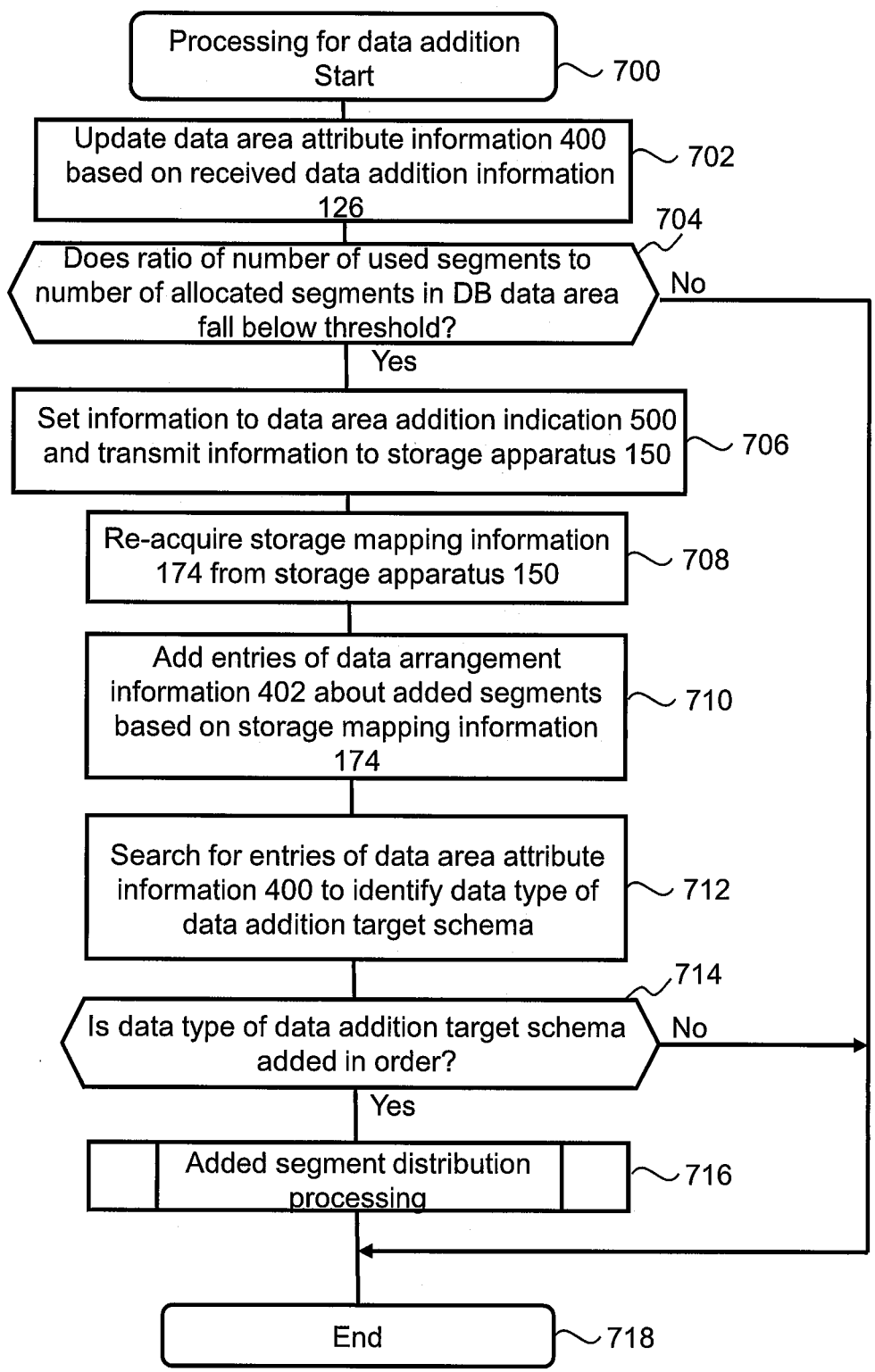
FIG. 7 is a flow chart of processing for data addition according to the first embodiment.

FIG. 7 is a flow chart of processing for data addition according to Embodiment 1.

The processing for data addition is realized by the management program 140 being executed by the CPU 104 of the computer 100.

The management program 140 updates entries of the corresponding DB data area of the data area attribute information 400 based on the data addition information 126 received in step 610 in FIG. 6 (step 702) and determines whether the ratio of the number of segments used to the number of allocated segments of entries of the DB data area falls below a predetermined threshold (step 704). The predetermined threshold may internally be held by the management program 140 or may be set by the system administrator when the management program 140 is activated. In step 704 described above, whether the number of segments unused is equal to or less than a predetermined amount is determined, depending on whether the ratio of the number of segments used to the number of allocated segments of entries of the DB data area falls below the predetermined threshold, but instead, for example, whether segments to store DB data to be added are insufficient may be determined or whether the absolute number of segments unused is equal to or less than a predetermined value may be determined.

If, as a result of the determination in step 704, the ratio of the number of segments used to the number of allocated segments falls below the predetermined threshold (Yes in step 704), the management program 140 performs processing in step 706 and thereafter and if the ratio does not fall below the predetermined threshold (No in step 704), the management program 140 terminates the processing for data addition (step 718).

In step 706, the management program 140 sets information to each field of the data area addition indication 500 and transmits the data area addition indication 500 to the storage apparatus 150 (step 706). More specifically, the management program 140 sets ST-ID of the field 416 of an entry of the corresponding DB data area of the DB data area attribute information table 400 to the field 502 of the data area addition indication 500, LUN of the field 418 to the field 504 of the data area addition indication 500, and the number of requested additional segments to the field 506. The number of requested additional segments to be set to the field 506 of the data area addition indication 500 may be a value given by the system administrator in advance or a value calculated from the number of currently allocated segments (for example, half the number of currently allocated segments).

After receiving a response of the data area addition indication 500 transmitted in step 706 from the storage apparatus 150, the management program 140 re-acquires the storage mapping information 174 from the storage apparatus 150 (step 708) and, on the basis of information on the acquired storage mapping information, adds entries of the data arrangement information 402 of newly added segments in the storage apparatus 150 (step 710).

Subsequently, the management program 140 searches for entries corresponding to the DB data area to which DB data of the data area attribute information 400 has been added to identify the data type of the schema of the added DB data from the value of the field 414 (step 712) and determines whether the data type is the ordered addition, that is, whether the schema is an ordered schema (step 714).

If, as a result of the determination in step 714, the data type is the ordered addition (Yes in step 714), the management program 140 performs added segment distribution processing (see FIG. 8) (step 716) and then terminates the processing for data addition (step 718). On the other hand, if the data type is not the ordered addition (No in step 714), the management program 140 directly terminates processing for data addition (step 718).

Figure 8:
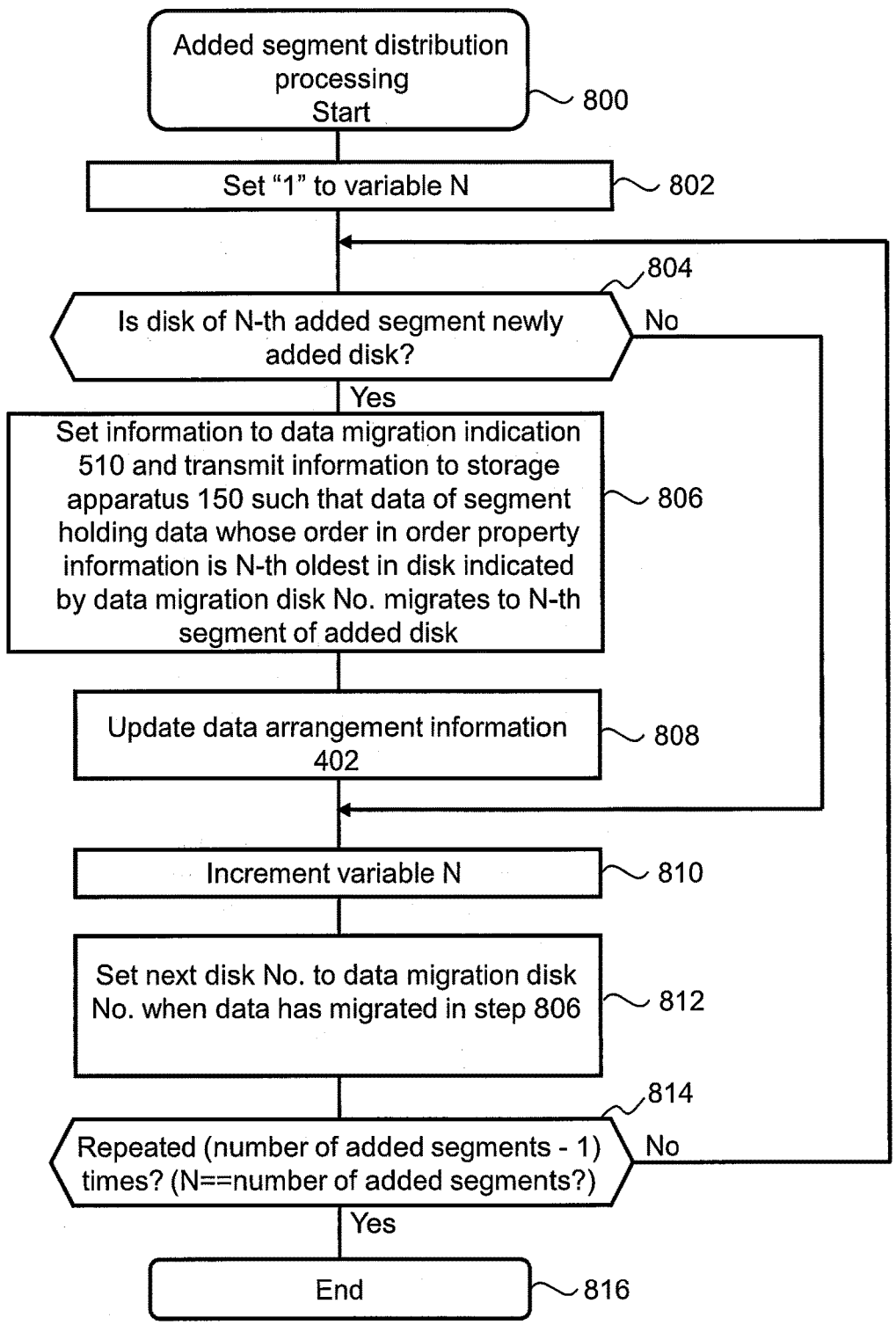
FIG. 8 is a flow chart of added segment distribution processing according to the first embodiment.

FIG. 8 is a flow chart of added segment distribution processing according to Embodiment 1.

The added segment distribution processing is realized by the management program 140 being executed by the CPU 104 of the computer 100.

The management program 140 sets "1" to a variable N (step 802). Next, the management program 140 searches the DB data arrangement information 402 to determine whether the disk in which the N-th segment among added segments is present is the newly added disk (second storage device set), that is, whether the disk is not used as a disk of disks constituting all existing DB data areas (one or more first storage device sets) (step 804) and if, as a result, the disk is not the newly added disk (second storage device set) (No in step 804), the management program 140 migrates the processing to step 810.

On the other hand, if, as a result of the determination in step 804, the disk is the newly added disk (second storage device set) (Yes in step 804), the management program 140 sets information to the data migration indication 510 such that DB data (data unit) of the segment holding the N-th oldest DB data in the order of order property information in the field 440 among segments on the disk indicated by the data migration disk No. stored in the field 424 of the corresponding entry migrates to the N-th segment of the newly added disk and transmits the data migration indication 510 to the storage apparatus 150 (step 806). More specifically, the management program 140 stores the disk No. of the disk indicated by the data migration disk No. in the field 516 of the data migration indication 510, the segment No. of the segment holding the N-th oldest DB data on the disk in the field 518, the disk No. of the newly added disk in the field 520, and the segment No. of the N-th segment of the newly added disk in the field 522.

Next, after receiving a response of the data migration indication 510 transmitted in step 806 from the storage apparatus 150, the management program 140 updates the data arrangement information 402 in accordance with content of the DB data migration (step 808). More specifically, the order property information and data range information in the fields 440, 442 of the entry corresponding to the segment of the migration source disk are entered in the fields 440, 442 of the entry of the segment of the migration destination disk respectively and content of the fields 440, 442 of the entry of the migration source is cleared.

Subsequently, the management program 140 increments (+1) the variable N (step 810) and if data is migrated in step 806, sets the number of the next disk (next first storage device set) to the data migration disk No. in the field 424 (step 812), and determines whether the variable N is equal to the number of added segments, that is, whether the processing (step 804 to step 812) is repeated (number of added segments −1) times (step 814). If, as a result, the variable N is smaller than the number of added segments (No in step 814), the management program 140 performs the processing starting with step 804 again. Therefore, the processing from step 804 to step 812 will be repeated (number of added segments of the DB data set in step 706 −1) times. With this processing, free areas are distributed over a plurality of disks 900 to 910 while avoiding concentrating consecutive DB data on one disk. Also with this processing, the plurality of disks 900 to 910 includes approximately the same number of free areas (free segments).

On the other hand, if, as a result of the determination in step 814, the variable N is equal to the number of added segments (Yes in step 814), the management program 140 terminates the added segment distribution processing (step 816).

Next, a concrete example of migration of DB data when the processing for data addition shown in FIG. 7 and the added segment distribution processing shown in FIG. 8 are performed will be described.

Figure 9A:
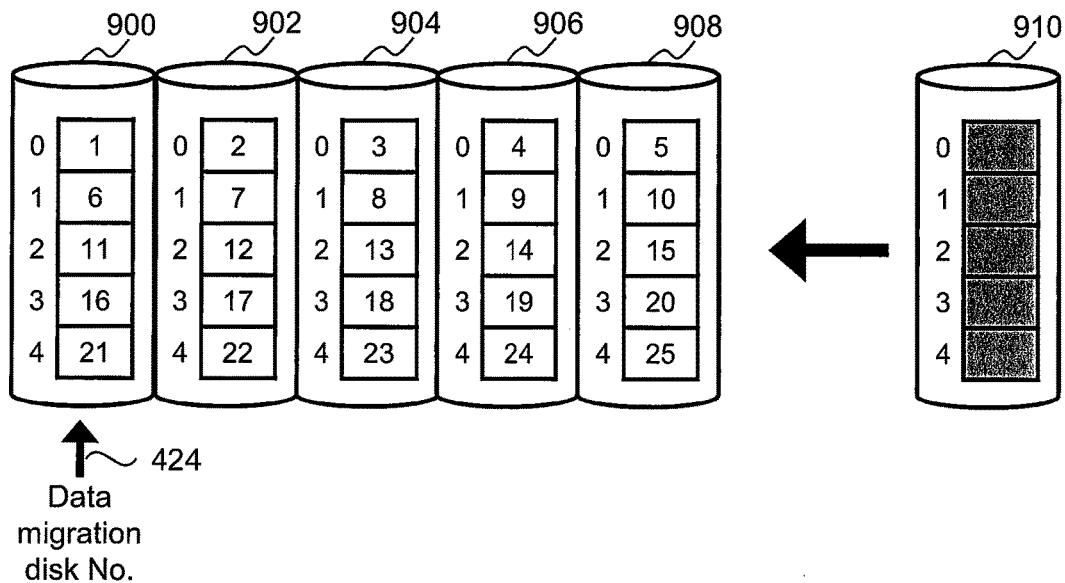
FIG. 9A is a first diagram illustrating migration of DB data according to the first embodiment.
Figure 9B:
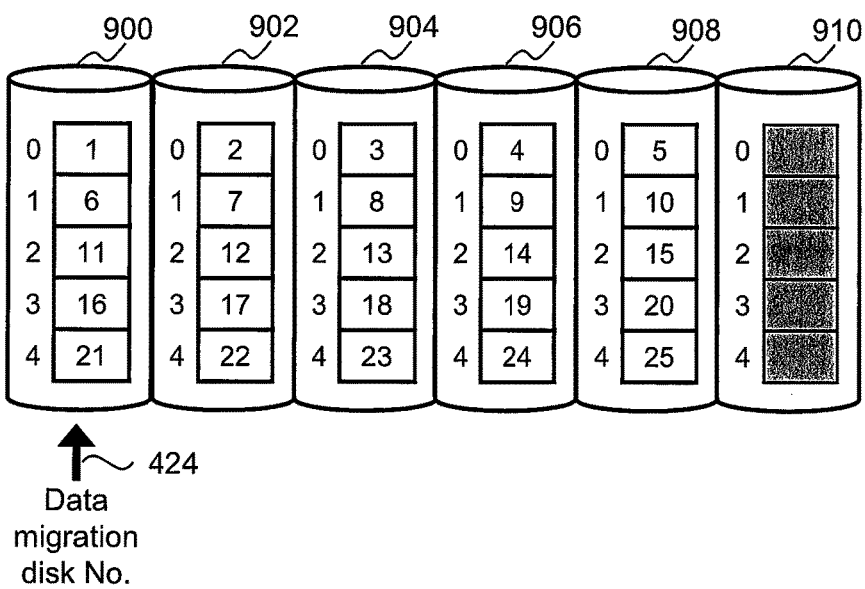
FIG. 9B is a second diagram illustrating the migration of the DB data according to the first embodiment.
Figure 10A:
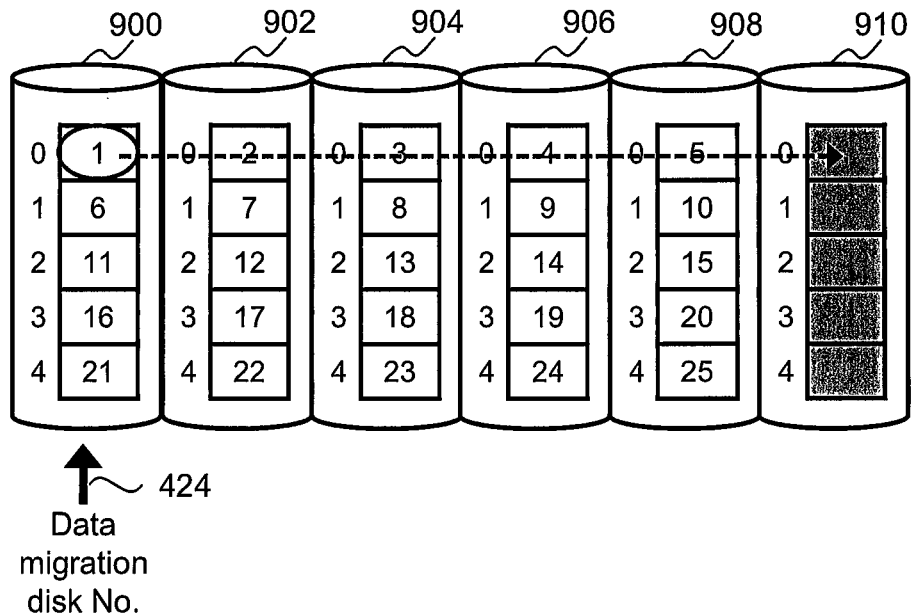
FIG. 10A is a third diagram illustrating the migration of the DB data according to the first embodiment.
Figure 10B:
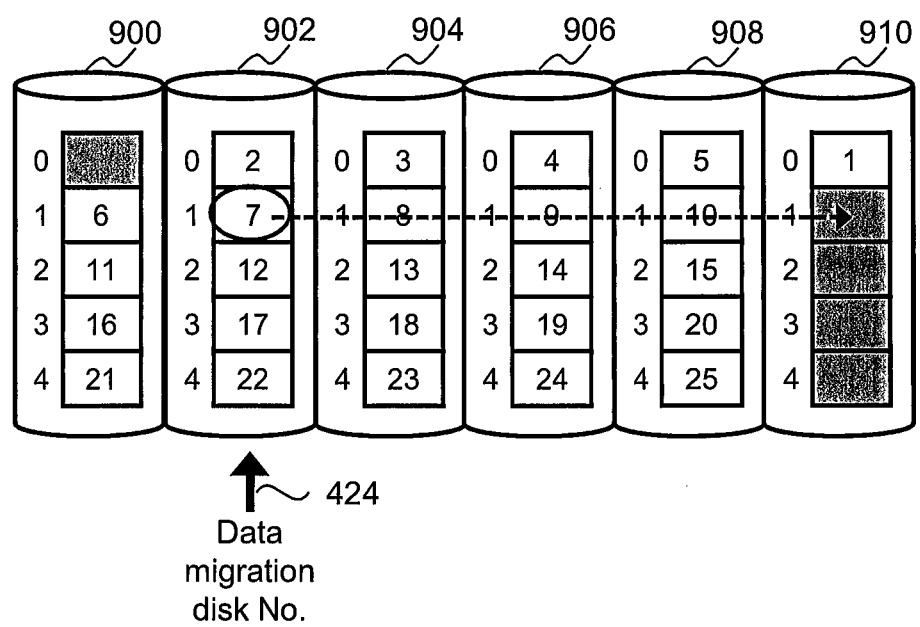
FIG. 10B is a fourth diagram illustrating the migration of the DB data according to the first embodiment.
Figure 11A:
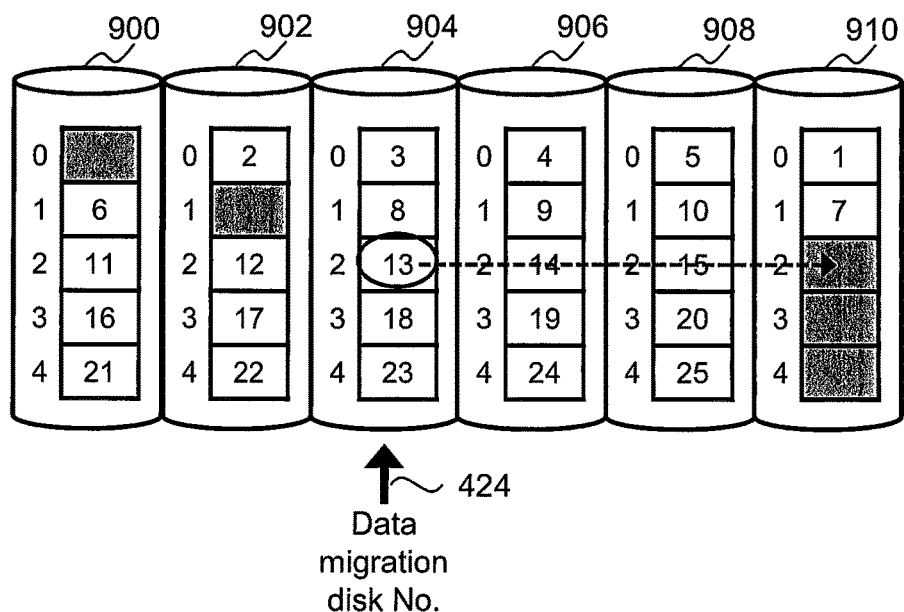
FIG. 11A is a fifth diagram illustrating the migration of the DB data according to the first embodiment.
Figure 11B:
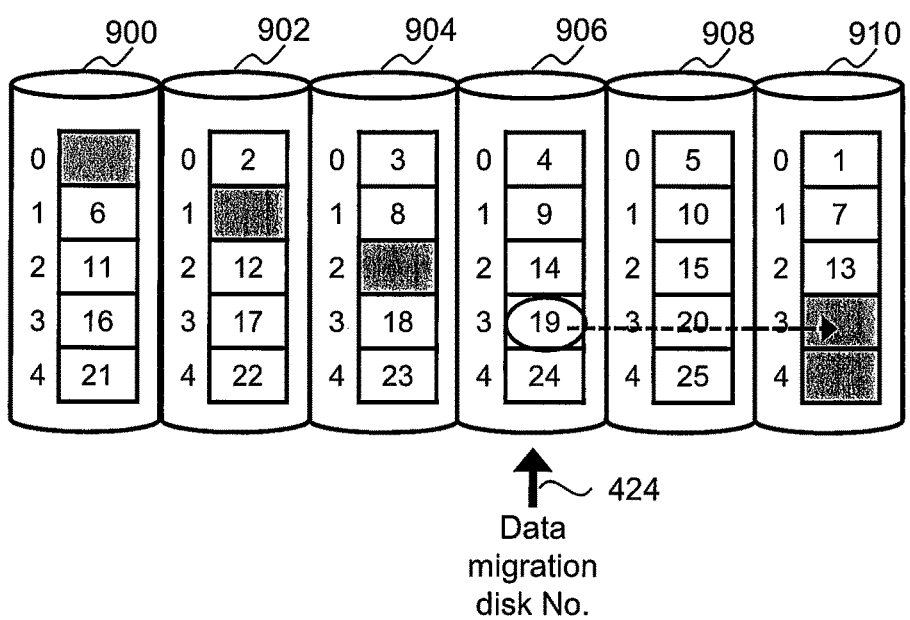
FIG. 11B is a sixth diagram illustrating the migration of the DB data according to the first embodiment.
Figure 12A:
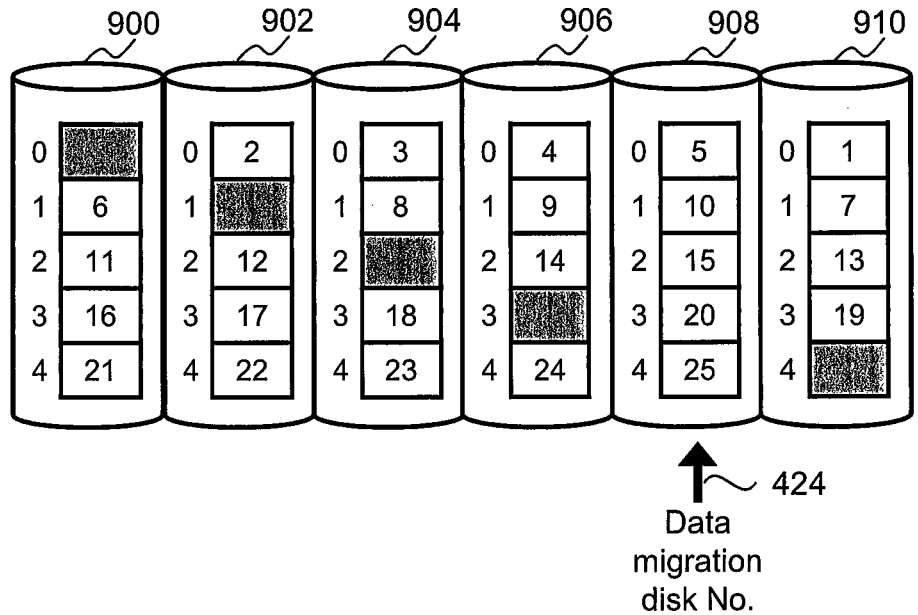
FIG. 12A is a seventh diagram illustrating the migration of the DB data according to the first embodiment.
Figure 12B:
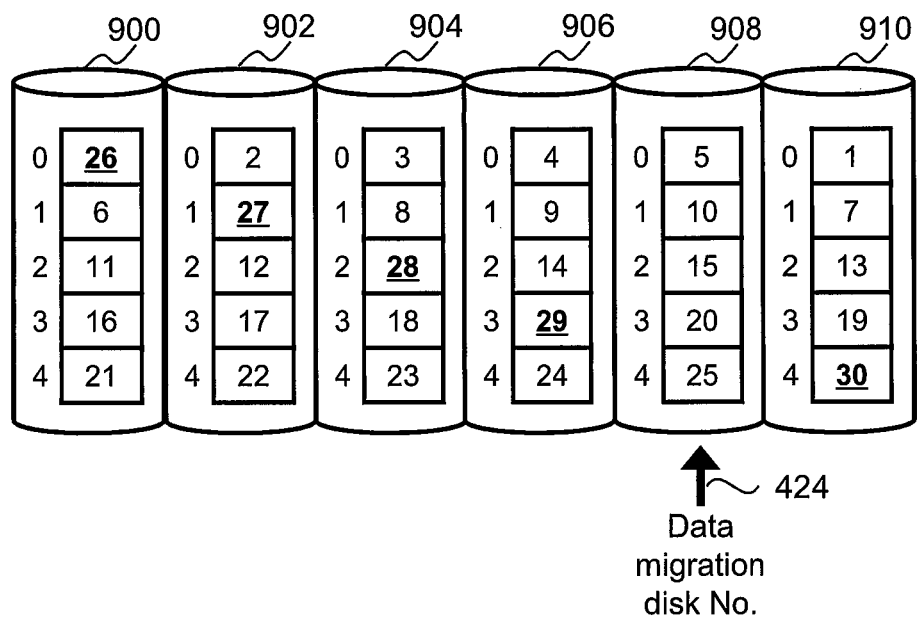
FIG. 12B is an eighth diagram illustrating the migration of the DB data according to the first embodiment.

FIG. 9A is a first diagram illustrating migration of DB data according to Embodiment 1. FIG. 9B is a second diagram illustrating the migration of the DB data according to Embodiment 1. FIG. 10A is a third diagram illustrating the migration of the DB data according to Embodiment 1. FIG. 10B is a fourth diagram illustrating the migration of the DB data according to Embodiment 1. FIG. 11A is a fifth diagram illustrating the migration of the DB data according to Embodiment 1. FIG. 11B is a sixth diagram illustrating the migration of the DB data according to Embodiment 1. FIG. 12A is a seventh diagram illustrating the migration of the DB data according to Embodiment 1. FIG. 12B is an eighth diagram illustrating the migration of the DB data according to Embodiment 1. In these drawings, each rectangle inside the disk (900 and so on) corresponds to each segment, the number on the left side of the rectangle indicates the number of the segment in the relevant disk, the number shown inside the rectangle indicates the order property of DB data (data unit) stored in the relevant segment. For example, "1" as the number inside the rectangle indicates that data whose order property is 1 is stored in the corresponding segment. In individual illustrated disks, segments arranged in the vertical direction are assumed to be arranged along a sequence of addresses. That is, that segments are consecutive (adjacent) means that the address range is consecutive (adjacent). According to the above figures, when P disks are present (P is an integer equal to or larger than 2), P (horizontal)×Q (vertical) segments are available (Q is an integer equal to or larger than 1). That is, each disk includes Q segments. The number of Q changes depending on the capacity of the disk (or which range of the disk to use as the storage range of DB data). Segments in the same row are assumed to have the same address.

As shown in FIG. 9A, storage areas of five disks (five first storage device sets) of the disks 900 to 908 are allocated as data areas where data of some schema when processing is started is stored. That is, the "disk" here may be a single storage device or a plurality of storage devices (for example, a RAID (Redundant Array of Independent (or Inexpensive) Disks) group). Five segments are allocated to each of the disks 900 to 908. Data (data unit) of the order property 1 is stored in the segment of the segment No. 0 of the disk 900, data of the order property 2 is stored in the segment of the segment No. 0 of the disk 902, data of the order property 3 is stored in the segment of the segment No. 0 of the disk 904, and similarly each piece of data is stored in a segment of a disk. Such a state is realized by, for example, when the DBMS 120 (or the CPU 166 of the storage apparatus 150) stores ordered data starting with the first data, sequentially switching the disk as a storage destination.

Taking the above state into account, migration of data in the added segment distribution processing will be described below by taking a case when five segments of the disk 910 (second storage device set) is newly added as storage areas to store data of the schema as an example. It is assumed that the data migration disk No. stored in the field 424 of the DB data area attribute information 400 points to the disk 900.

If five segments of the disk 910 are added as areas to store data of the schema, as shown in FIG. 9B, five segments of the new disk 910 are added to existing data areas of the disks 900 to 908. For example, the management program 140 may monitor to check whether the new disk 910 is added to the disks 900 to 908 (group of disks) and detect the addition when the new disk 910 is added. In this state, segments of segment Nos. 0 to 4 of the disk 910 are unused. If the added segment distribution processing shown in FIG. 8 is not performed, data in the next order (for example, data of order properties 26 to 30) will sequentially be added to the segment No. 0 to the segment No. 4 of the disk 910. If, in this state, access to data of immediate five segments (in this example, data of the order properties 26 to 30) is assumed, access will concentrate on the disk 910 and, as a result, the degree of parallelism is not increased and performance cannot be improved.

If, in the state shown in FIG. 9B, processing (step S804 to step 808) when the variable N=1 in the added segment distribution processing is set is performed, as shown in FIG. 10A, the management program 140 migrates data (data unit) of the order property 1. That is, if the added segment distribution processing is performed, the data migration disk No. in the field 424 points to the disk 900 and therefore, the management program 140 migrates data of the segment (here, the segment No. 0) having the N-th (here, first) oldest data (here, data of the order property 1) as the order property in the disk 900 to the N-th (here, first) segment (here, the segment of the segment No. 0) of the added disk 910. Then, the management program 140 sets such that the data migration disk No. in the field 424 of the DB data area attribute information 400 points to the next disk, that is, the disk 902.

Then, if processing (step S804 to step 808) when the variable N=2 in the added segment distribution processing is set is performed, as shown in FIG. 10B, the management program 140 migrates data of the order property 7. That is, if the added segment distribution processing is performed, the data migration disk No. in the field 424 points to the disk 902 and therefore, the management program 140 migrates data of the segment (here, the segment No. 1) having the N-th (here, second) oldest data (here, data of the order property 7) as the order property in the disk 902 to the N-th (here, second) segment (here, the segment No. 1) of the added disk 910. Because the sequentially incremented N-th oldest DB data is made to migrate, the management program 140 can migrate DB data whose order is relatively apart from that of DB data migrated from other disks to the disk 910. That is, the possibility of consecutive DB data being migrated to the disk 910 can appropriately be reduced. Then, the management program 140 sets such that the data migration disk No. in the field 424 of the DB data area attribute information 400 points to the next disk, that is, the disk 904.

Then, if processing (step S804 to step 808) when the variable N=3 in the added segment distribution processing is set is performed, as shown in FIG. 11A, the management program 140 migrates data of the order property 13. That is, if the added segment distribution processing is performed, the data migration disk No. in the field 424 points to the disk 904 and therefore, the management program 140 migrates data of the segment (here, the segment No. 2) having the N-th (here, third) oldest data (here, data of the order property 13) as the order property in the disk 904 to the N-th (here, third) segment (here, the segment No. 2) of the added disk 910. Then, the management program 140 sets such that the data migration disk No. in the field 424 of the DB data area attribute information 400 points to the next disk, that is, the disk 906.

Then, if processing (step S804 to step 808) when the variable N=4 in the added segment distribution processing is set is performed, as shown in FIG. 11B, the management program 140 migrates data of the order property 19. That is, if the added segment distribution processing is performed, the data migration disk No. in the field 424 points to the disk 906 and therefore, the management program 140 migrates data of the segment (here, the segment No. 3) having the N-th (here, fourth) oldest data (here, data of the order property 19) as the order property in the disk 906 to the N-th (here, fourth) segment (here, the segment No. 3) of the added disk 910. Then, the management program 140 sets such that the data migration disk No. in the field 424 of the DB data area attribute information 400 points to the next disk, that is, the disk 908.

If, in the state of FIG. 9B, the added segment distribution processing is performed and data migration is completed, the state shown in FIG. 12A is reached. That is, unused segments before new data is added are distributed over different disks like the segment No. 0 of the disk 900, the segment No. 1 of the disk 902, the segment No. 2 of the disk 904, the segment No. 3 of the disk 906, and the segment No. 4 of the disk 910.

If, in the state of FIG. 12A, data of the order properties 26 to 30 is added to the storage apparatus 150 by the DBMS 120, as shown in FIG. 12B, consecutive data will be stored by being distributed over different disks. That is, data of the order property 26 is stored in the segment of the segment No. 0 of the disk 900, data of the order property 27 is stored in the segment of the segment No. 1 of the disk 902, data of the order property 28 is stored in the segment of the segment No. 2 of the disk 904, data of the order property 29 is stored in the segment of the segment No. 3 of the disk 906, and data of the order property 30 is stored in the segment of the segment No. 4 of the disk 910.

That is, according to the above description, the number of disks is P (P is an integer equal to or larger than 2), each disk includes Q segments (Q is an integer equal to or larger than 1), and therefore, P disks includes (P×Q) segments and for each set of P pieces of DB data in which the order is consecutive, P pieces of DB data in which the order is consecutive are stored in P segments of the same row in different disks. In this case, the management program 140 migrates the X-th oldest data (X is an integer and X=0, 1, . . . , (Q−1)) of the X-th first storage device set from a segment of the X-th disk to a free segment of the added disk. Then, if the free segment arising in the X-th disk is not adjacent to the segment storing the latest data unit in the X-th disk, the management program 140 migrates the second newest DB data in the X-th disk from the segment storing the second newest DB data to the free segment in the X-th disk.

According to Embodiment 1, as described above, unused data areas (segments) will be distributed over each disk and then, new data will be added to the unused segments. As a result, the state shown in FIG. 12B is reached and if access to data of immediate five segments (here, data of the order properties 26 to 30) is assumed, the access is distributed over the disk 900, the disk 902, the disk 904, the disk 906, and the disk 910 and therefore, the degree of parallelism of processing is increased and performance can be improved.

If access to data of immediate 10 segments (here, data of the order properties 21 to 30) is assumed here, a case when with the technology in Embodiment 1 only, there emerges a disk in which the physical access range (accessed range) on the disk widens can be considered. In the disk 900, for example, the range from the segment No. 0 to the segment No. 4 is accessed. Because performance improves with a decreasing physical access range, the ratio of performance improvement of a disk whose access range has widened decreases. In Embodiment 2 below, by contrast, a technology capable of narrowing the physical access range of a disk will be described.

[Embodiment 2]

Next, a computer system according to Embodiment 2 will be described.

A computer system according to Embodiment 2 is a computer system according to Embodiment 1 in which segment neighboring processing (see FIG. 14) is further performed in the added segment distribution processing. The configuration of the computer system according to Embodiment 2 is the same as the computer system according to Embodiment 1 shown in FIG. 1. Hereinafter, the computer system according to Embodiment 2 will be described by focusing on differences from the computer system according to Embodiment 1.

Figure 13:
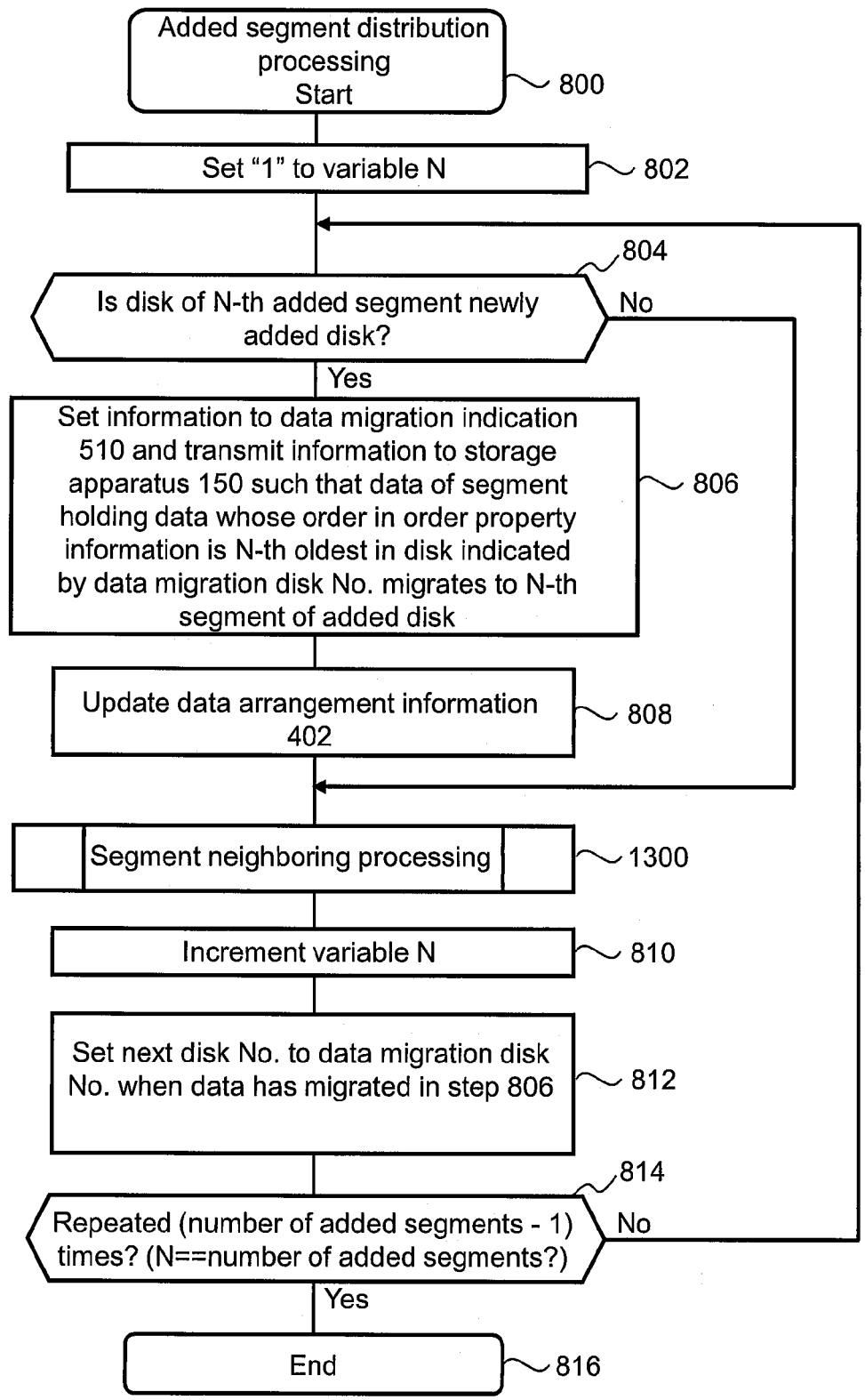
FIG. 13 is a flow chart of added segment distribution processing according to a second embodiment.

FIG. 13 is a flowchart of the added segment distribution processing according to Embodiment 2. The same reference signs are attached to similar portions to those of the added segment distribution processing according to Embodiment 1 shown in FIG. 8.

In the added segment distribution processing according to Embodiment 2, step 1300 in which the segment neighboring processing (see FIG. 14) is performed is added between step 808 and step 810.

Figure 14:
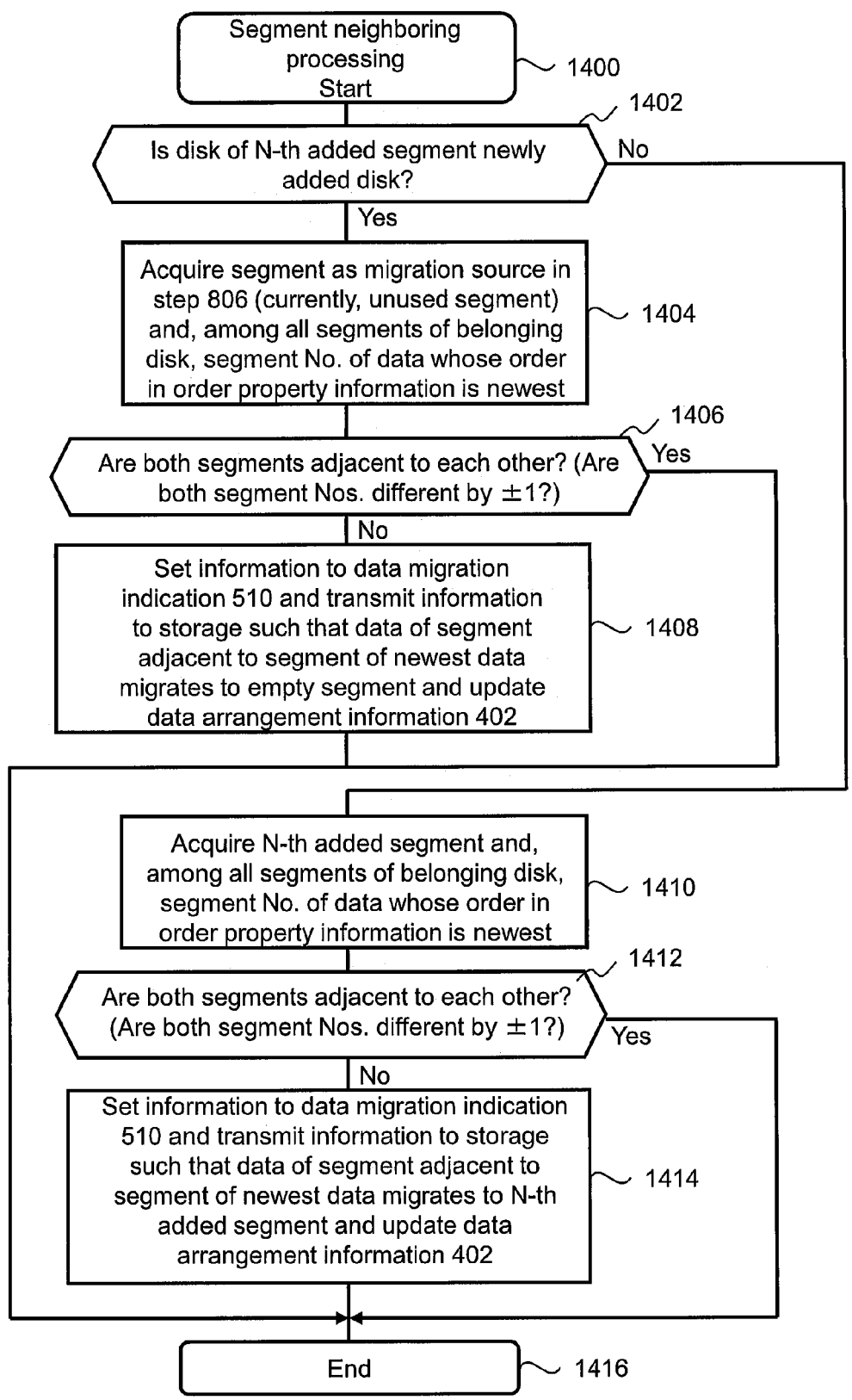
FIG. 14 is a flowchart of segment neighboring processing according to the second embodiment.

FIG. 14 is a flow chart of the segment neighboring processing according to Embodiment 2.

The management program 140 searches the DB data arrangement information 402 to determine whether the disk in which the N-th (the variable N is a variable inherited from the added segment distribution processing) segment among added segments is present is the newly added disk, that is, whether the disk is not used as a disk of disks constituting all existing DB data areas (step 1402) and if, as a result, the disk is not the newly added disk (No in step 1402), the management program 140 migrates the processing to step 1410.

If, as a result of the determination in step 1402, the disk is the newly added disk (Yes in step 1402), the management program 140 acquires the segment No. of the segment as the migration source in step 806 of the added segment distribution processing in FIG. 13, that is, a currently unused segment and the segment No. of the segment whose order property information in the field 440 is the newest among all segments of the disk to which the relevant segment belongs (step 1404) and determines whether both segments are adjacent to each other, that is, the difference of segment Nos. of both segments is ±1 (step 1406).

If, as a result, both segments are adjacent to each other (Yes in step 1406), the management program 140 terminates the segment neighboring processing (step 1416). On the other hand, if both segments are not adjacent to each other (No in step 1406), the management program 140 sets information to the data migration information 510 such that data of a segment adjacent to the segment storing the newest data among all segments of the disk migrates to the segment as the migration source in step 806, transmits the data migration information 510 to the storage apparatus 150, receives a response from the storage apparatus 150 and then updates the data arrangement information 402 (step 1408) before terminating the segment neighboring processing (step 1416).

If, as a result of the determination in step 1402, the disk is not the newly added disk (No in step 1402), the management program 140 acquires the N-th segment (currently, an unused segment) among added segments and the segment No. of the segment whose order property information in the field 440 is the newest among all segments of the disk to which the relevant segment belongs (step 1410) and determines whether both segments are adjacent to each other, that is, the difference of segment Nos. of both segments is ±1 (step 1412).

If, as a result, both segments are adjacent to each other (Yes in step 1412), the management program 140 terminates the segment neighboring processing (step 1416). On the other hand, if both segments are not adjacent to each other (No in step 1412), the management program 140 sets information to the data migration information 510 such that data of a segment adjacent to the segment storing the newest data among all segments of the disk migrates to the N-th segment among added segments, transmits the data migration information 510 to the storage apparatus 150, receives a response from the storage apparatus 150 and then updates the data arrangement information 402 (step 1414) before terminating the segment neighboring processing (step 1416).

If segments on both sides of the segment storing the newest order property on the same disk are unused, data of a still next segment may be made to migrate. The segment whose order property is the newest on the same disk and an unused segment are made to be neighboring in the segment neighboring processing, but the present invention is not limited to such an example and, for example, data may made to migrate such that segments storing data of high search frequencies are neighboring by holding statistical information of search frequencies of the data range in each schema inside the management program 140. If no free area is present within a predetermined range (for example, within two segments in the forward and backward directions) of the segment storing the newest data, data of one of segments in the range may be made to migrate to a free area.

Next, a concrete example of migration of DB data when the segment neighboring processing shown in FIG. 14 is performed will be described.

Figure 15A:
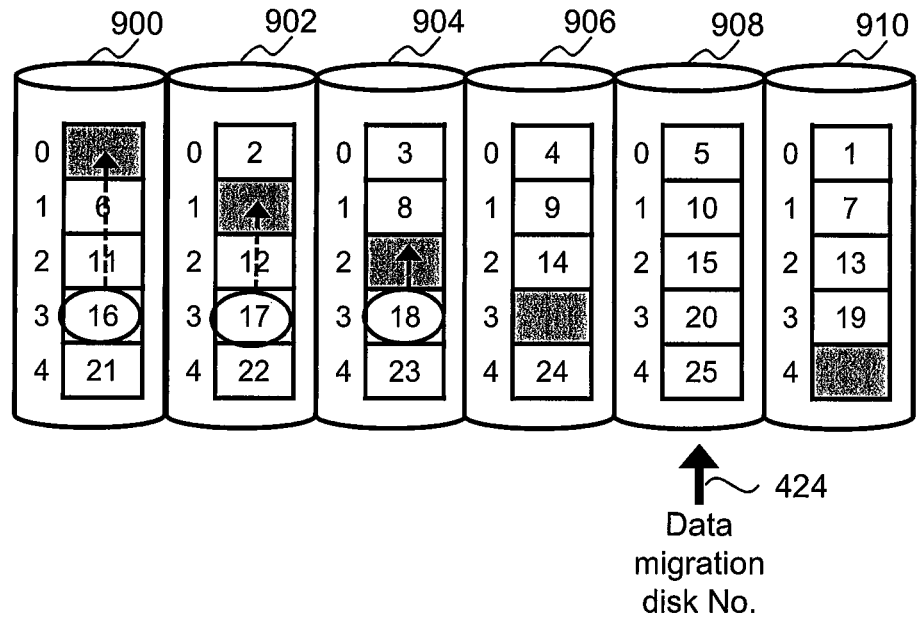
FIG. 15A is a first diagram illustrating migration of DB data according to the second embodiment.
Figure 15B:
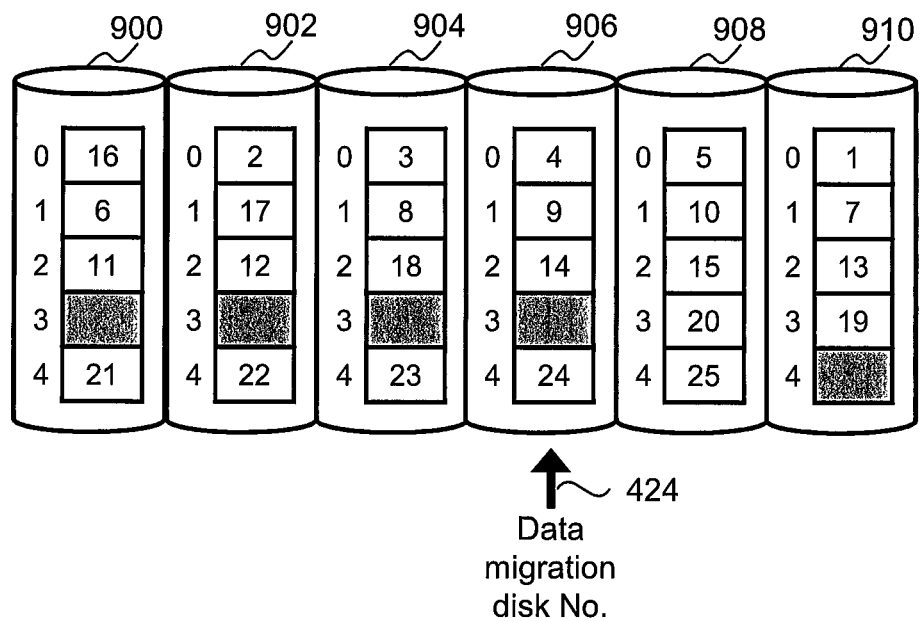
FIG. 15B is a second diagram illustrating the migration of the DB data according to the first embodiment.
Figure 16A:
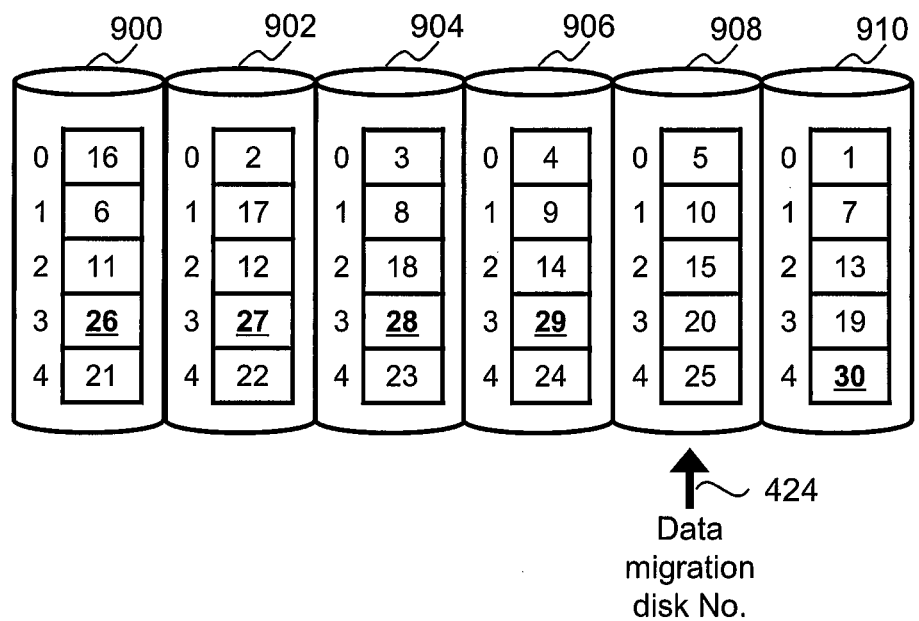
FIG. 16A is a third diagram illustrating the migration of the DB data according to the second embodiment.
Figure 16B:
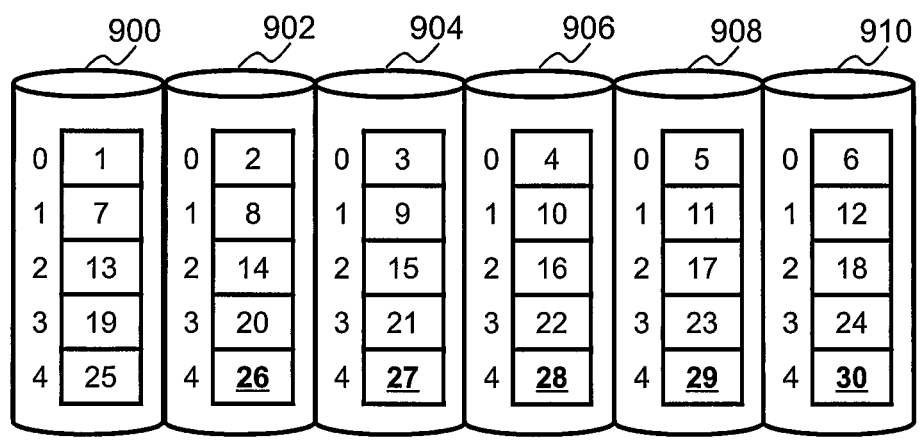
FIG. 16B is a diagram illustrating an ideal DB data arrangement.

FIG. 15A is a first diagram illustrating migration of DB data according to Embodiment 2. FIG. 15B is a second diagram illustrating the migration of the DB data according to Embodiment 1. FIG. 16A is a third diagram illustrating the migration of the DB data according to Embodiment 2. FIG. 16B is a diagram illustrating an ideal data arrangement.

FIG. 15A is a diagram conveniently summarizing the states (FIGS. 10B, 11A, 11B, and 12A) before the segment neighboring processing is performed in the added segment distribution processing shown in FIG. 13. The segment neighboring processing originating from one added segment is performed subsequently to processing on one segment of the added segment distribution processing.

First, after, as shown in FIG. 10B, data (data of the order property 1) of the segment No. 0 of the disk 900 migrates to the segment of the segment No. 0 of the disk 910, as shown in FIG. 15A, data (here, data of the order property 16) of the segment (here, the segment of the segment No. 3) adjacent to the segment (here, the segment of the segment No. 4) having the newest data in order property (here, data of the order property 21) in the disk 900 migrates to a segment (here, the segment of the segment No. 0) made unused by the added segment distribution processing. Similarly, after, as shown in FIG. 11A, data (data of the order property 7) of the segment No. 1 of the disk 902 migrates to the segment of the segment No. 1 of the disk 910, as shown in FIG. 15A, data (data of the order property 17) of the segment No. 3 of the disk 902 is migrated to the segment of the segment No. 1. Also, after, as shown in FIG. 11B, data (data of the order property 13) of the segment No. 2 of the disk 904 migrates to the segment of the segment No. 2 of the disk 910, as shown in FIG. 15A, data (data of the order property 18) of the segment No. 3 of the disk 904 is migrated to the segment of the segment No. 2. Regarding the disk 906, the segment (here, the segment of the segment No. 4) having the newest data in order property (here, data of the order property 24) in the disk 906 and the segment (here, the segment of the segment No. 3) made unused by the added segment distribution processing are neighboring and therefore, no migration of data is caused by the segment neighboring processing.

When migration of data is completed after the segment neighboring processing being performed, the state shown in FIG. 15B is reached. That is, before new data is added, unused segments are distributed over different disks like the segment No. 3 of the disk 900, the segment No. 3 of the disk 902, the segment No. 3 of the disk 904, the segment No. 3 of the disk 906, and the segment No. 4 of the disk 910. In addition, unused segments are adjacent to the segment having the newest data in each disk.

If, in the state shown in FIG. 15B, data of the order properties 26 to 30 is added, as shown in FIG. 16A, the data is stored by being distributed over different disks. That is, data of the order property 26 is stored in the segment of the segment No. 3 of the disk 900, data of the order property 27 is stored in the segment of the segment No. 3 of the disk 902, data of the order property 28 is stored in the segment of the segment No. 3 of the disk 904, data of the order property 29 is stored in the segment of the segment No. 3 of the disk 906, and data of the order property 30 is stored in the segment of the segment No. 4 of the disk 910.

From the above, in Embodiment 2, added data areas (segments) are distributed over disks and unused segments in individual disks are adjacent to segments having the newest data and then, new data is added to the unused segments. As a result, the state shown in FIG. 16A is reached and if, for example, access to data of immediate five segments (here, data of the order properties 26 to 30) is assumed, like Embodiment 1, the access is distributed over the disk 900, the disk 902, the disk 904, the disk 906, and the disk 910 and therefore, the degree of parallelism of processing is increased and performance can be improved. Further, if access to data of immediate 10 segments (here, data of the order properties 21 to 30) is assumed, while there emerges a disk (for example, the disk 900) in which the physical access range on the disk widens in Embodiment 1, the physical access range in the disk 900 is limited to the segment No. 3 and the segment No. 4 in Embodiment 2 and an occurrence of a disk in which the access range widens can be suppressed. Because performance improves with a decreasing physical access range on the disk, when compared with Embodiment 1, performance can further be improved according to Embodiment 2.

Effects of Embodiment 2 will further be described by showing an ideal DB data arrangement.

FIG. 16B is a diagram illustrating an ideal data arrangement.

The arrangement of data shown in FIG. 16B can be realized by, for example, migrating DB data such that the DB data is arranged in the order according to order property information between disks and within each disk from the state in FIG. 9B and then adding data of the order properties 26 to 30 to unused segments.

If, in the state shown in FIG. 16B, access to data of immediate five segments (here, data of the order properties 26 to 30) is assumed, the access is distributed over the disk 902, the disk 904, the disk 906, the disk 908, and the disk 910 and therefore, the degree of parallelism of processing is increased and performance can be improved. Further, if access to data of immediate 10 segments (here, data of the order properties 21 to 30) is assumed, the access range becomes minimum in any disk.

To reach the state shown in FIG. 16B from the state shown in FIG. 9B, data of segments needs to be migrated 20 times. To reach the state shown in FIG. 16A from the state shown in FIG. 9B, by contrast, data of segments needs to be migrated only seven times. The difference between the number of times of data migration to reach the ideal state as shown in FIG. 16B and the number of times of data migration to reach the state as shown in FIG. 16A increases with an increasing number of segments constituting a schema. According to Embodiment 2, an effect similar to that of the state of an ideal data arrangement can be obtained in access to data of some range while the number of times of segment migration and overheads thereof being suppressed.

Next, a modification of Embodiment 1 will be described.

The present modification has a different method of determining the segment intended for data migration from that in the added segment distribution processing according to Embodiment 1.

More specifically, in step 806 of the added segment distribution processing shown in FIG. 8, the management program 140 sets information to the data migration indication 510 such that DB data of the (N+1)-th oldest segment in the order of order property information in the field 440 among segments of the disk indicated by the data migration disk No. stored in the field 424 of the corresponding entry migrates to the N-th segment of the newly added disk and transmits the data migration indication 510 to the storage apparatus 150.

Next, a concrete example of migration of DB data when the added segment distribution processing according to the modification is performed will be described.

Figure 17A:
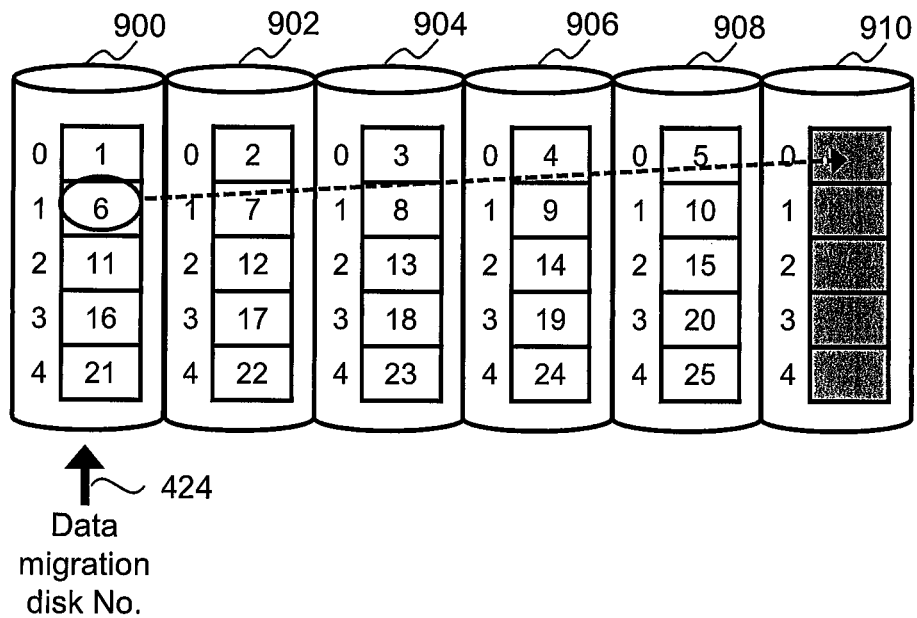
FIG. 17A is a first diagram illustrating migration of DB data according to a modification.
Figure 17B:
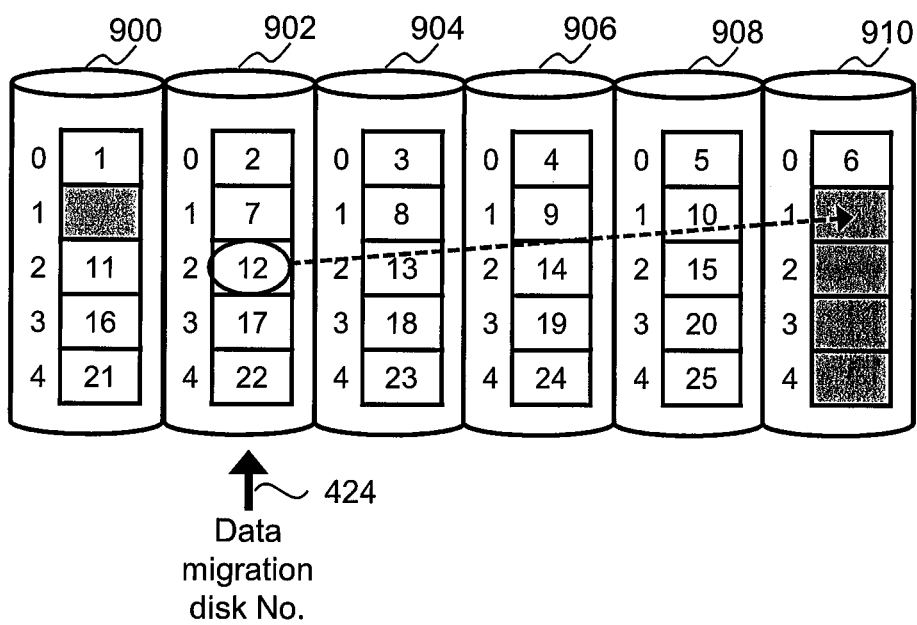
FIG. 17B is a second diagram illustrating the migration of the DB data according to the modification.
Figure 18A:
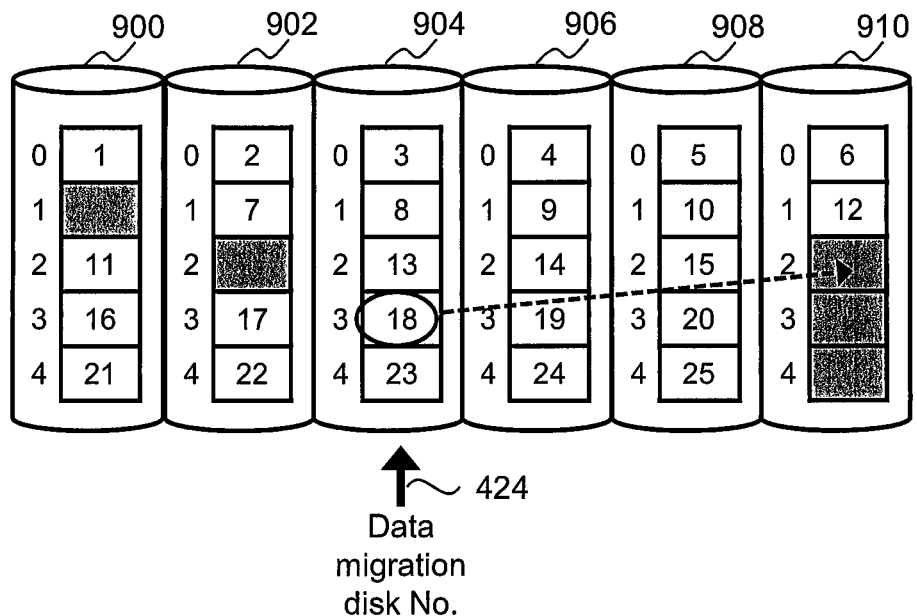
FIG. 18A is a third diagram illustrating the migration of the DB data according to the modification.
Figure 18B:
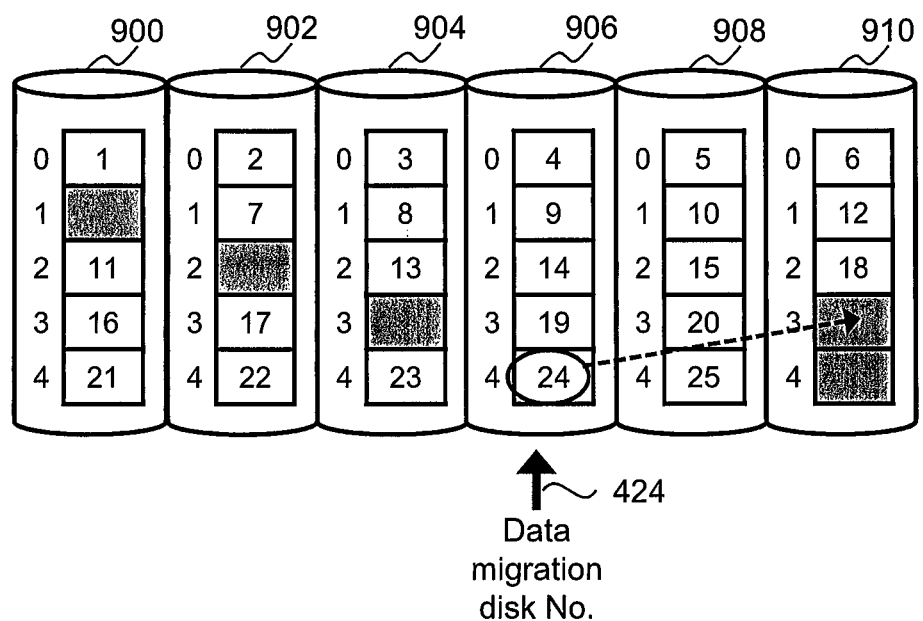
FIG. 18B is a fourth diagram illustrating the migration of the DB data according to the modification.
Figure 19A:
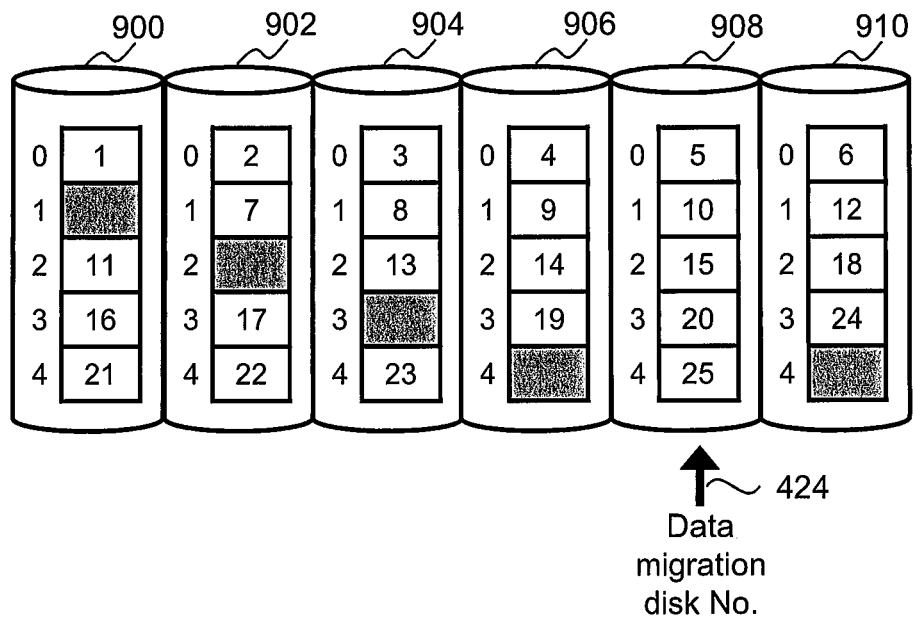
FIG. 19A is a fifth diagram illustrating the migration of the DB data according to the modification.
Figure 19B:
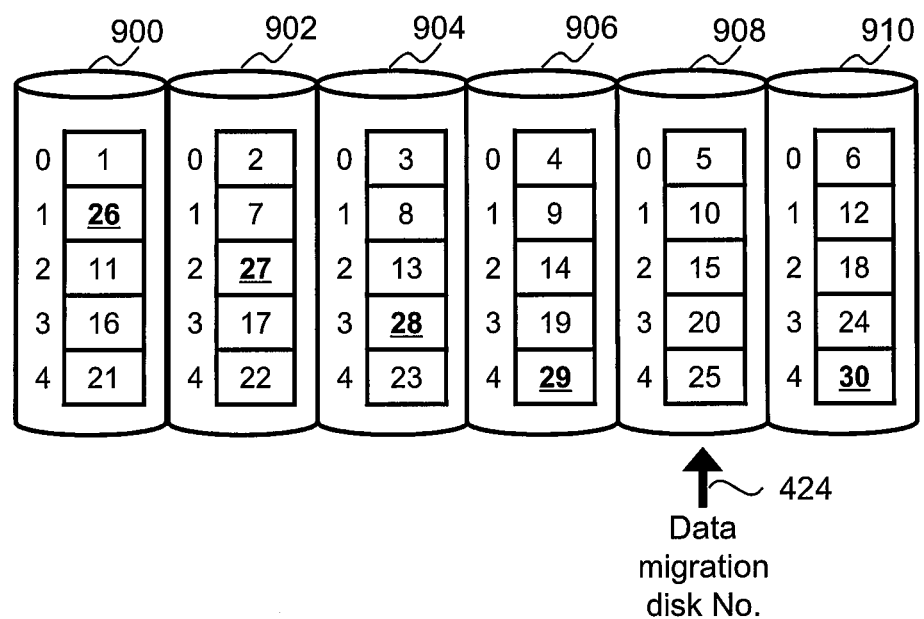
FIG. 19B is a sixth diagram illustrating the migration of the DB data according to the modification.

FIG. 17A is a first diagram illustrating migration of DB data according to the modification. FIG. 17B is a second diagram illustrating the migration of the DB data according to the modification. FIG. 18A is a third diagram illustrating the migration of the DB data according to the modification. FIG. 18B is a fourth diagram illustrating the migration of the DB data according to the modification. FIG. 19A is a fifth diagram illustrating the migration of the DB data according to the modification. FIG. 19B is a sixth diagram illustrating the migration of the DB data according to the modification.

If, in the state shown in FIG. 9B, processing (step S804 to step 808) when the variable N=1 in the added segment distribution processing according to the modification is set is performed, as shown in FIG. 17A, data of the order property 6 is migrated. That is, if the added segment distribution processing is performed, the data migration disk No. in the field 424 points to the disk 900 and therefore, data of the segment (here, the segment No. 1) having the (N+1)-th (here, second) oldest data (here, data of the order property 6) as the order property in the disk 900 is migrated to the N-th (here, first) segment (here, the segment of the segment No. 0) of the added disk 910. Then, the data migration disk No. in the field 424 of the DB data area attribute information 400 is set to point to the next disk, that is, the disk 902.

Then, if processing (step S804 to step 808) when the variable N=2 in the added segment distribution processing is set is performed, as shown in FIG. 17B, data of the order property 12 is migrated. That is, if the added segment distribution processing is performed, the data migration disk No. in the field 424 points to the disk 902 and therefore, data of the segment (here, the segment No. 2) having the (N+1)-th (here, third) oldest data (here, data of the order property 12) as the order property in the disk 902 is migrated to the N-th (here, second) segment (here, the segment No. 1) of the added disk 910. Then, the data migration disk No. in the field 424 of the DB data area attribute information 400 is set to point to the next disk, that is, the disk 904.

Then, if processing (step S804 to step 808) when the variable N=3 in the added segment distribution processing is set is performed, as shown in FIG. 18A, data of the order property 18 is migrated. That is, if the added segment distribution processing is performed, the data migration disk No. in the field 424 points to the disk 904 and therefore, data of the segment (here, the segment No. 3) having the (N+1)-th (here, fourth) oldest data (here, data of the order property 18) as the order property in the disk 904 is migrated to the N-th (here, third) segment (here, the segment No. 2) of the added disk 910. Then, the data migration disk No. in the field 424 of the DB data area attribute information 400 is set to point to the next disk, that is, the disk 906.

Then, if processing (step 3804 to step 808) when the variable N=4 in the added segment distribution processing is set is performed, as shown in FIG. 18B, data of the order property 24 is migrated. That is, if the added segment distribution processing is performed, the data migration disk No. in the field 424 points to the disk 906 and therefore, data of the segment (here, the segment No. 4) having the (N+1)-th (here, fifth) oldest data (here, data of the order property 24) as the order property in the disk 906 is migrated to the N-th (here, fourth) segment (here, the segment No. 3) of the added disk 910. Then, the data migration disk No. in the field 424 of the DB data area attribute information 400 is set to point to the next disk, that is, the disk 908.

Then, if the added segment distribution processing is performed and data migration is completed, the state shown in FIG. 19A is reached. That is, unused segments before new data is added are distributed over different disks like the segment No. 1 of the disk 900, the segment No. 2 of the disk 902, the segment No. 3 of the disk 904, the segment No. 4 of the disk 906, and the segment No. 5 of the disk 910.

If, in the state of FIG. 19A, data of the order properties 26 to 30 is added, as shown in FIG. 19B, consecutive data will be stored by being distributed over different disks. That is, data of the order property 26 is stored in the segment of the segment No. 1 of the disk 900, data of the order property 27 is stored in the segment of the segment No. 2 of the disk 902, data of the order property 28 is stored in the segment of the segment No. 3 of the disk 904, data of the order property 29 is stored in the segment of the segment No. 4 of the disk 906, and data of the order property 30 is stored in the segment of the segment No. 4 of the disk 910.

According to the modification, as described above, like Embodiment 1, unused data areas (segments) will be distributed over each disk and then, new data will be added to the unused segments. As a result, the state shown in FIG. 19B is reached and if access to data of immediate five segments (here, data of the order properties 26 to 30) is assumed, the access is distributed over the disk 900, the disk 902, the disk 904, the disk 906, and the disk 910 and therefore, the degree of parallelism of processing is increased and performance can be improved. Further, according to the modification, when compared with Embodiment 1, old data can be stored in segments closer to the head of each disk. Incidentally, processing similar to the processing in Embodiment 2 may be performed for the modification.

In the first and Embodiment 2s described above, the added segment distribution processing is performed when DB data areas are equal to or less than a predetermined amount (for example, DB data areas are insufficient or the ratio of the number of segments used to the number of segments allocated to the DB data area falls below a predetermined threshold), but the added segment distribution processing is not limited to such a case and may be performed, for example, after being triggered by an indication from the system administrator. Accordingly, even if DB data areas are not insufficient, the degree of parallelism of I/O can be increased and performance can be improved by adding a new disk to migrate data of segments of the disk constituting existing DB data areas to segments of the added disk.

In the foregoing, some embodiments and a modification have been described, but the present invention is not limited to the above embodiments and modification. For example, the management program 140 may be executed by another computer coupled to the computer 100. In that case, the other computer may constitute a management system.

REFERENCE SIGNS LIST

100 Computer
120 DBMS
122 Schema information
124 DB mapping information
126 DB data addition information
130 OS
132 OS mapping information
140 Management program
142 DB data area management information
150 Storage apparatus
154 Controller
156 Disk (HDD)
172 Control program
174 Storage mapping information
180, 182 Network

The invention claimed is:
1. A management system that manages a plurality of data units constituting one or more schemas of a database in a storage apparatus, the management system comprising:
storage resources; and
a control device coupled to the storage resources,
wherein the storage apparatus includes a plurality of first storage device sets having a plurality of storage areas, wherein an ordered schema constituted of the plurality of data units having order properties defining respective orders is included in the one or more schemas, wherein the storage resources store management information including mapping information as information indicating which data unit constituting the ordered schema is stored in which storage area and order information indicating the order of the data units, wherein the first storage device set is a set of one or more first storage devices, and wherein the control device is configured to (A) migrate, when a second storage device set, which is a set of one or more second storage devices and in which each of the storage areas is a free storage area, is added to the first storage device set, two or more data units not consecutive in the order among the plurality of data units stored in the plurality of storage areas in the first storage device set respectively from at least the one first storage device set to the free storage areas of the second storage device set based on the management information, such that a plurality of the free storage areas is distributed over the first storage device sets and the second storage device set, and such that data units that are consecutive in order are stored in different storage device sets and no data units that are consecutive in order are stored in the same storage device set, without migrating data units between different first storage device sets.

2. The management system according to claim 1, wherein the number of the first storage device sets is P (P is an integer equal to or larger than 2), each of the first storage devices includes Q storage areas (Q is an integer equal to or larger than 1), and therefore, the P first storage device sets include the (P ×Q) storage areas, wherein the P data units consecutive in the order are stored in the P storage areas of the same row in the different first storage device sets in units of the P data units consecutive in the order, and wherein the control device is configured to migrate the X-th oldest data unit (X is an integer and X=0, 1, . . . , (Q−1)) of the X-th first storage device set from the storage area of the X-th first storage device set to the free storage area of the second storage device set in (A).

3. The management system according to claim 2, wherein, after (A), when the free storage area produced in the X-th first storage device set is not adjacent to the storage area storing a latest data unit in the X-th first storage device set, the control device is configured to migrate a second newest data unit in the X-th first storage device set from the storage area storing the second newest data unit to the free storage area in the X-th first storage device set.

4. The management system according to claim 2, wherein, in (A), the control device is configured to terminate (A) after repeating migration of the data units from the first storage device set to the second storage device set Y times (Y is a natural number) and wherein a value of the Y is equal to or less than the number of the storage areas possessed by the second storage device set.

5. The management system according to claim 1, wherein the control device is configured to migrate, when there are the plurality of first storage device sets, as many the data units as the first storage device sets from the respective first storage device sets to the second storage device set.

6. The management system according to claim 5, wherein the control device is configured to migrate, when there are the plurality of first storage device sets, the same number of the data units from the respective first storage device sets to the second storage device set by sequentially switching the first storage device set from which to select the data unit to be migrated to the second storage device set.

7. The management system according to claim 6, wherein the control device is configured to migrate, when there are the plurality of first storage device sets, the data units the orders of which are relatively apart from the respective first storage device sets to the second storage device set.

8. The management system according to claim 7, wherein the control device is configured to make ranking of the order in the first storage device sets of the data unit, migrated to the second storage device set, different between the different first storage device sets.

9. The management system according to claim 1, wherein the control device is configured to (B) cause addition of a new storage area capable of storing the data unit of the ordered schema when determination is made that free areas of the storage areas capable of storing the data unit of the ordered schema in the first storage device set are equal to or less than a predetermined amount, determine whether the new storage area added is the storage area of the second storage device set, and perform (A) when the new storage area is the storage area of the second storage device set.

10. The management system according to claim 9, wherein the control device is configured to determine whether the addition of a new data unit to the schema of the database has occurred, perform (B) when the addition of the data unit has occurred, and store the new data unit in the free area after performing (A) so that the data units that are consecutive can be stored in different storage device sets.

11. The management system according to claim 1, wherein the control device is configured to, after performing (A), (C) migrate, when the free area and the storage area in which a latest data unit in the first storage device set containing the free area are not present within a predetermined range, the data unit within the predetermined range to the free area.

12. The management system according to claim 11, wherein the control device has the predetermined range in (C) described above as a range adjacent to the free area.

13. The management system according to claim 11, wherein the control device is configured to store the new data units in the free areas after performing (C), so that a plurality of new data units in the first storage device set can be stored in a relatively limited range of the first storage device set.

14. The management system according to claim 1, wherein, in (A), the control device is configured to migrate one or more data units within the same first storage device set for at least one of the plurality of first storage device sets, in addition to migrating the two or more data units not consecutive in the order to the free storage areas of the second storage device set based on the management information, such that data units that are consecutive in order are stored in different storage device sets and no data units that are consecutive in order are stored in the same storage device set, without migrating data units between different first storage device sets.

15. A non-transitory computer readable storage medium storing a computer program that causes a computer to manage a plurality of data units constituting one or more schemas of a database in a storage apparatus,
wherein the storage apparatus includes a plurality of first storage device sets having a plurality of storage areas, and
wherein an ordered schema constituted of the plurality of data units having order properties defining respective orders is included in the one or more schemas,
the computer program causing the computer to:
determine whether a second storage device set, which is a set of one or more second storage devices and in which each of the storage areas is a free storage area, is added to the first storage device set; and
when a result of a determination is affirmative, migrate two or more data units not consecutive in the order among the plurality of data units stored in the plurality of storage areas in the first storage device set respectively from at least the one first storage device set to the free storage areas of the second storage device set based on based on management information including mapping information as information indicating which data unit constituting the ordered schema is stored in which storage area and order information indicating the order of the data units, such that a plurality of the free storage areas is distributed over the first storage device sets and the second storage device set;
wherein the number of the first storage device sets is P (P is an integer equal to or larger than 2), each of the first storage devices includes Q storage areas (Q is an integer equal to or larger than 1), and therefore, the P first storage device sets include the (P×Q) storage areas,
wherein the P data units consecutive in the order are stored in the P storage areas of the same row in the different first storage device sets in units of the P data units consecutive in the order, and
wherein the computer program causes the computer to migrate the X-th oldest data unit (X is an integer and X=0, 1, . . . , (Q−1)) of the X-th first storage device set from the storage area of the X-th first storage device set to the free storage area of the second storage device set in (A).

16. The non-transitory computer readable storage medium according to claim 15,
wherein, after (A), when the free storage area produced in the X-th first storage device set is not adjacent to the storage area storing a latest data unit in the X-th first storage device set, the computer program causes the computer to migrate a second newest data unit in the X-th first storage device set from the storage area storing the second newest data unit to the free storage area in the X-th first storage device set.

17. The non-transitory computer readable storage medium according to claim 16,
wherein, in (A), the computer program causes the computer to terminate (A) after repeating migration of the data units from the first storage device set to the second storage device set Y times (Y is a natural number) and
wherein a value of the Y is equal to or less than the number of the storage areas possessed by the second storage device set.

18. A method of managing a plurality of data units constituting one or more schemas of a database in a storage apparatus,
wherein the storage apparatus includes a plurality of first storage device sets having a plurality of storage areas, and
wherein an ordered schema constituted of the plurality of data units having order properties defining respective orders is included in the one or more schemas,
the method comprising:
determining whether a second storage device set, which is a set of one or more second storage devices and in which each of the storage areas is a free storage area, is added to the first storage device set;
when a result of a determination is affirmative, migrating two or more data units not consecutive in the order among the plurality of data units stored in the plurality of storage areas in the first storage device set respectively from at least the one first storage device set to the free storage areas of the second storage device set based on based on management information including mapping information as information indicating which data unit constituting the ordered schema is stored in which storage area and order information indicating the order of the data units, such that a plurality of the free storage areas is distributed over the first storage device sets and the second storage device set; and
migrating, when there are the plurality of first storage device sets, the same number of the data units from the respective first storage device sets to the second storage device set by sequentially switching the first storage device set from which to select the data unit to be migrated to the second storage device set.

19. The method according to claim 18, further comprising:
migrating, when there are the plurality of first storage device sets, the data units the orders of which are relatively apart from the respective first storage device sets to the second storage device set.

20. The method according to claim 19, further comprising:
making ranking of the order in the first storage device sets of the data unit, migrated to the second storage device set, different between the different first storage device sets.

* * * * *